US012760908B2

(12) United States Patent
Park et al.

(10) Patent No.: US 12,760,908 B2
(45) Date of Patent: Oct. 13, 2026

(54) COOKING APPARATUS

(71) Applicant: SAMSUNG ELECTRONICS CO., LTD., Suwon-si (KR)

(72) Inventors: Geunyong Park, Suwon-si (KR); Sangwon Yun, Suwon-si (KR); Changhyun Lee, Suwon-si (KR); Sangjin Jeong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 862 days.

(21) Appl. No.: 18/160,078

(22) Filed: Jan. 26, 2023

(65) Prior Publication Data

US 2023/0304672 A1 Sep. 28, 2023

Related U.S. Application Data

(63) Continuation of application No. PCT/KR2023/000411, filed on Jan. 10, 2023.

(30) Foreign Application Priority Data

Mar. 28, 2022 (KR) ........................ 10-2022-0038383
Jul. 4, 2022 (KR) ........................ 10-2022-0082151

(51) Int. Cl.
*F24C 15/02* (2006.01)
*H05B 6/64* (2006.01)

(52) U.S. Cl.
CPC .......... *F24C 15/022* (2013.01); *H05B 6/6417* (2013.01)

(58) Field of Classification Search
CPC ...... H05B 6/64; H05B 6/6408; H05B 6/6414; H05B 6/6417; F24C 15/02; F24C 15/022;
(Continued)

(56) References Cited

U.S. PATENT DOCUMENTS 6,333,495 B1 12/2001 Park
8,087,611 B2 1/2012 Arnold et al.
(Continued)

FOREIGN PATENT DOCUMENTS

CN 205351433 U 6/2016
CN 111035235 A 4/2020
(Continued)

OTHER PUBLICATIONS

International Search Report and Written Opinion of the International Searching Authority dated Apr. 24, 2023, in connection with International Application No. PCT/KR2023/000411, 11 pages.
(Continued)

*Primary Examiner* — Hung D Nguyen

(57) ABSTRACT

A cooking apparatus is disclosed. The cooking apparatus includes: a main body forming a cooking room; a door configured to open and close the cooking room; a door latch movably installed in the door; a sensor configured to contact the door latch; a controller electrically connected with the sensor; a heating source electrically connected with the controller; and a door lock including an interfering portion configured to interfere with opening of the door and a deformable portion configured to elastically support the interfering portion such that the interfering portion is movable, and in response to the contact of the door latch with the sensor ending by opening the door, the controller may control the heating source to stop operating.

19 Claims, 35 Drawing Sheets

(58) Field of Classification Search
CPC .... F24C 15/023; F24C 15/026; F24C 15/028; F24C 7/02; F24C 7/087; E05C 19/02; E05C 19/06; E05C 19/10; E05C 3/12; E05C 3/14; E05C 3/16; E05C 3/167; E05C 3/30
See application file for complete search history.

(56) References Cited

U.S. PATENT DOCUMENTS

| | | | | |
|---|---|---|---|---|
| 8,844,514 | B2 | 9/2014 | Steurer | |
| 9,745,788 | B2 | 8/2017 | Becker et al. | |
| 9,943,090 | B2 | 4/2018 | Schilling | |
| 10,746,411 | B2 | 8/2020 | Ham et al. | |
| 10,781,625 | B2 | 9/2020 | Estill et al. | |
| 10,962,228 | B2 | 3/2021 | Park et al. | |
| 11,236,911 | B2 | 2/2022 | DeYoung | |
| 11,751,294 | B2 | 9/2023 | Shin et al. | |
| 2005/0194380 | A1* | 9/2005 | Ho Kim | H05B 6/6417 219/722 |
| 2007/0175891 | A1 | 8/2007 | Maeda | |
| 2016/0348919 | A1 | 12/2016 | Ivanovic et al. | |
| 2019/0316781 | A1 | 10/2019 | Kim et al. | |
| 2021/0095513 | A1 | 4/2021 | Ivanovic et al. | |
| 2022/0099306 | A1* | 3/2022 | Balekundri | E05C 19/06 |

FOREIGN PATENT DOCUMENTS

| | | | | |
|---|---|---|---|---|
| CN | 212054124 | U | 12/2020 | |
| CN | 212054180 | U | 12/2020 | |
| EP | 1453361 | B1 | 12/2005 | |
| EP | 1998117 | A1 | 12/2008 | |
| EP | 2851492 | A1 * | 3/2015 | E05C 3/14 |
| JP | 2007-333309 | A | 12/2007 | |
| JP | 5246293 | B2 | 7/2013 | |
| KR | 840000975 | Y1 | 6/1984 | |
| KR | 10-1999-0030842 | A | 5/1999 | |
| KR | 200149715 | Y1 | 6/1999 | |
| KR | 10-1999-0054689 | A | 7/1999 | |
| KR | 10-0247784 | B1 | 5/2000 | |
| KR | 20000050713 | A | 8/2000 | |
| KR | 100385026 | B1 | 5/2003 | |
| KR | 10-2005-0108248 | A | 11/2005 | |
| KR | 10-0534541 | B1 | 12/2005 | |
| KR | 100593060 | B1 | 6/2006 | |
| KR | 20-2010-0000063 | U | 1/2010 | |
| KR | 10-2012-0091036 | A | 8/2012 | |
| KR | 20130047847 | A | 5/2013 | |
| KR | 10-2017-0055856 | A | 5/2017 | |
| KR | 10-2018-0087943 | A | 8/2018 | |
| KR | 10-2362076 | B1 | 2/2022 | |
| WO | 2009116094 | A1 | 9/2009 | |

OTHER PUBLICATIONS

Supplementary European Search Report dated Mar. 3, 2025, in connection with European Patent Application No. 23781128.6, 12 pages.

* cited by examiner

COOKING APPARATUS

CROSS-REFERENCE TO RELATED APPLICATIONS

This application is a bypass continuation of International Application No. PCT/KR2023/000411 filed Jan. 10, 2023, which priority under 35 U.S.C. § 119 to Korean Patent Application No. 10-2022-0038383, filed on Mar. 28, 2022 and Korean Patent Application No. 10-2022-0082151, filed on Jul. 4, 2022 in the Korean Intellectual Property Office, the disclosure of which are incorporated by reference herein in their entirety.

BACKGROUND

1. Field

The disclosure relates to a cooking apparatus, and more particularly, to a cooking apparatus including a door for opening or closing a cooking room.

2. Description of the Related Art

A cooking apparatus is an appliance for cooking a cooking material such as food by heating the cooking material, and provides various functions related to cooking, such as heating, defrosting, drying, sterilizing, etc. of a cooking material. Examples of the cooking apparatus include an oven, such as a gas oven or an electric oven, a microwave heating apparatus (hereinafter, referred to as a microwave), a gas range, an electric range, an Over The Range (OTR), a gas grill, an electric grill, etc.

The microwave is an appliance for cooking food with friction heat generated by disturbing the water's molecular arrangement of the food with electromagnetic waves, and the oven is an appliance for cooking food by transferring heat directly to the food or heating the inside of the cooking room through a heating source such as a heater for generating heat.

The cooking room is opened or closed by a door. According to an operation of the cooking apparatus to heat a cooking material accommodated inside the cooking room, the inside air of the cooking room is raised in temperature. At this time, in the case in which a user opens the door, the user is exposed to the risk of injury by the heated inside air of the cooking room.

SUMMARY

Therefore, it is an aspect of the disclosure to provide a cooking apparatus with improved user safety.

It is an aspect of the disclosure to provide a cooking apparatus of which a door does not open by a single operation.

The technical object intended to be achieved by the present document is not limited to the above-mentioned technical objects, and other technical objects not mentioned will be clearly understood by one of ordinary skill in the technical art to which the disclosure belongs from the following description.

In accordance with a concept of the disclosure, a cooking apparatus includes a main body forming a cooking room; a door configured to open and close the cooking room; a door latch movably installed in the door; a sensor configured to contact the door latch; a controller electrically connected with the sensor; a heating source electrically connected with the controller; and a door lock including an interfering portion configured to interfere with opening of the door and a deformable portion configured to elastically support the interfering portion such that the interfering portion is movable. In response to the contact of the door latch with the sensor ending by opening the door, the controller may control the heating source to stop operating.

The interfering portion may be movable to a first position of interfering with opening of the door and a second position of allowing opening of the door, and the deformable portion may elastically support the interfering portion toward the first position.

The interfering portion, at the first position, may be configured to all the door to move between a closed position of closing the cooking room and an interference position of limiting opening of the door by the interfering portion, and the interfering portion, at the second position, may be configured to allow the door to move between the closed position and an open position of opening the cooking room.

The door lock may include an operation surface formed in the interfering portion such that the interfering portion is movable by the door moving from the open position to the closed position.

The interfering portion may limit opening of the door by a friction force while the door is located at the interference position.

The interfering portion may include a support surface supporting the door in a direction in which the door closes the cooking room while the door is located at the interference position.

The second position of the interfering portion may be spaced further from the door than the first position of the interfering portion.

The sensor may be positioned inside the main body, and the door latch may be in contact with the sensor while the door is located at the closed position.

The main body may include a control panel positioned to a side of the door and including an inputter or a display, and the deformable portion may be installed on the control panel.

The main body may include an outer case to which the door is rotatably coupled, and the deformable portion may be installed on the outer case.

The door may include a catching protrusion protruding to interfere with the door lock.

The catching protrusion may protrude from a bottom of the door, and the interfering portion may protrude from the deformable portion to interfere with the catching protrusion.

The deformable portion may include a control portion protruding from the main body and configured to move the interfering portion.

The deformable portion may include a connecting portion connected with the interfering portion; and a coupling portion extending from the connecting portion in a direction away from the interfering portion, and including a coupling hole in which a coupling member penetrates.

The deformable portion may further include an extension portion extending from the connecting portion in the direction away from the interfering portion, the extension portion being movable with respect to the coupling portion.

In accordance with a concept of the disclosure, a cooking apparatus includes: an outer case; an inner case positioned inside the outer case, and forming a cooking room; a door configured to open and close the cooking room, wherein the door is in a closed position when the cooking room is closed; a control panel including a locking surface adjacent to the door and facing the door; an opening and closing device configured to lock and unlock the door closing the cooking room; a door latch provided in the door and configured to be movable by the opening and closing device; a magnetron positioned between the outer case and the inner case and configured to generate a high frequency; and a door lock configured to interfere with opening of the door, and coupled with the control panel, wherein the door lock includes: an interfering portion configured to be movable to a first position of interfering with opening of the door and a second position of allowing opening of the door; and a deformable portion coupled to the locking surface and configured to elastically support the interfering portion such that the interfering portion is movable to the first position and the second position. The door is movable between the closed position and an interference position of limiting opening of the door by the interfering portion while the interfering portion is located at the first position, and movable between the closed position and an open position while the interfering portion is located at the second position, and a heating source is configured to stop operating according to a movement of the door from the closed position to the open position while the interfering portion is located at the second position.

The cooking apparatus may further include: a sensor configured to be in contact with the door latch; a controller electrically connected with the sensor; and a high voltage capacitor and a high voltage transformer configured to apply a high voltage to the sensor, wherein the controller may control the high voltage capacitor or the high voltage transformer based on a signal transferred from the sensor.

The second position of the interfering portion may be spaced further from the door than the first position of the interfering portion.

The door lock may include an operation surface formed in the interfering portion such that the interfering portion is moved by the door while the door is moving from the open position to the closed position.

In accordance with a concept of the disclosure, a cooking apparatus includes a main body forming a cooking room; a door configured to open and close the cooking room, where the door is in a closed position when the cooking room is closed; and a door lock configured to interfere with opening of the door, wherein the door lock includes: an interfering portion configured to be movable to a first position of interfering with opening of the door and a second position of allowing opening of the door; and a deformable portion coupled with the door and configured to elastically support the interfering portion such that the interfering portion is movable to the first position and the second position. The door is movable between the closed position and an interference position of limiting opening of the door by the interfering portion while the interfering portion is located at the first position, and movable between the closed position and an open position while the interfering portion is located at the second position.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
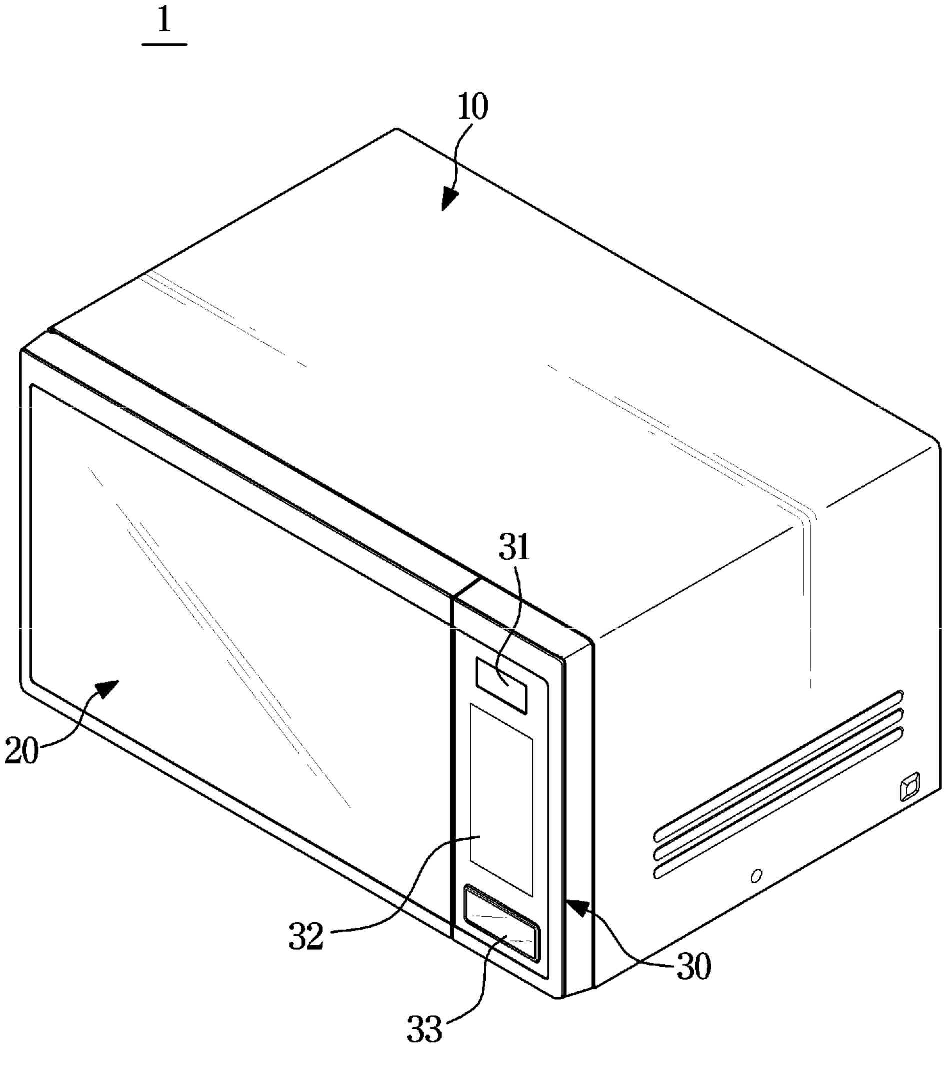
FIG. 1 is a perspective view of a cooking apparatus according to an embodiment of the disclosure.

FIGS. 1 through 35, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the present document and terms used therein are not intended to limit the technical features described in this document to specific embodiments, and should be understood to include various modifications, equivalents, or substitutes of the corresponding embodiments.

In connection with the description of the drawings, similar reference numerals may be used for similar or related components.

The singular form of a noun corresponding to an item may include one or a plurality of the items unless clearly indicated otherwise in a related context.

In this document, phrases, such as "A or B", "at least one of A and B", "at least one of A or B," "A, B or C," "at least one of A, B and C," and "at least one of A, B, or C", may include any one or all possible combinations of items listed together in the corresponding phrase among the phrases.

As used herein, the term "and/or" includes any and all combinations of one or more of associated listed items.

Terms such as "first", "second", or "first" or "second" may be used simply to distinguish a component from other components, without limiting the component in other aspects (e.g., importance or order).

Some (e.g., a first) component is referred to as "coupled" or "connected" with or without the terms "functionally" or "communicatively" to another (e.g., second) component. When mentioned, it means that any of the above components can be connected to the other components directly (e.g., by wire), wirelessly, or via a third component.

It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

It will be understood that when a certain component is referred to as being "connected to", "coupled to", "supported by" or "in contact with" another component, it can be directly or indirectly connected to, coupled to, supported by, or in contact with the other component. When a component is indirectly connected to, coupled to, supported by, or in contact with another component, it may be connected to, coupled to, supported by, or in contact with the other component through a third component.

It will also be understood that when a component is referred to as being "on" or "over" another component, it can be directly on the other component or intervening components may also be present.

Meanwhile, in the following description, the terms "up-down direction", "lower side", "front-rear direction", etc. are defined based on the drawings, and the shapes and positions of the components are not limited by the terms.

Figure 2:
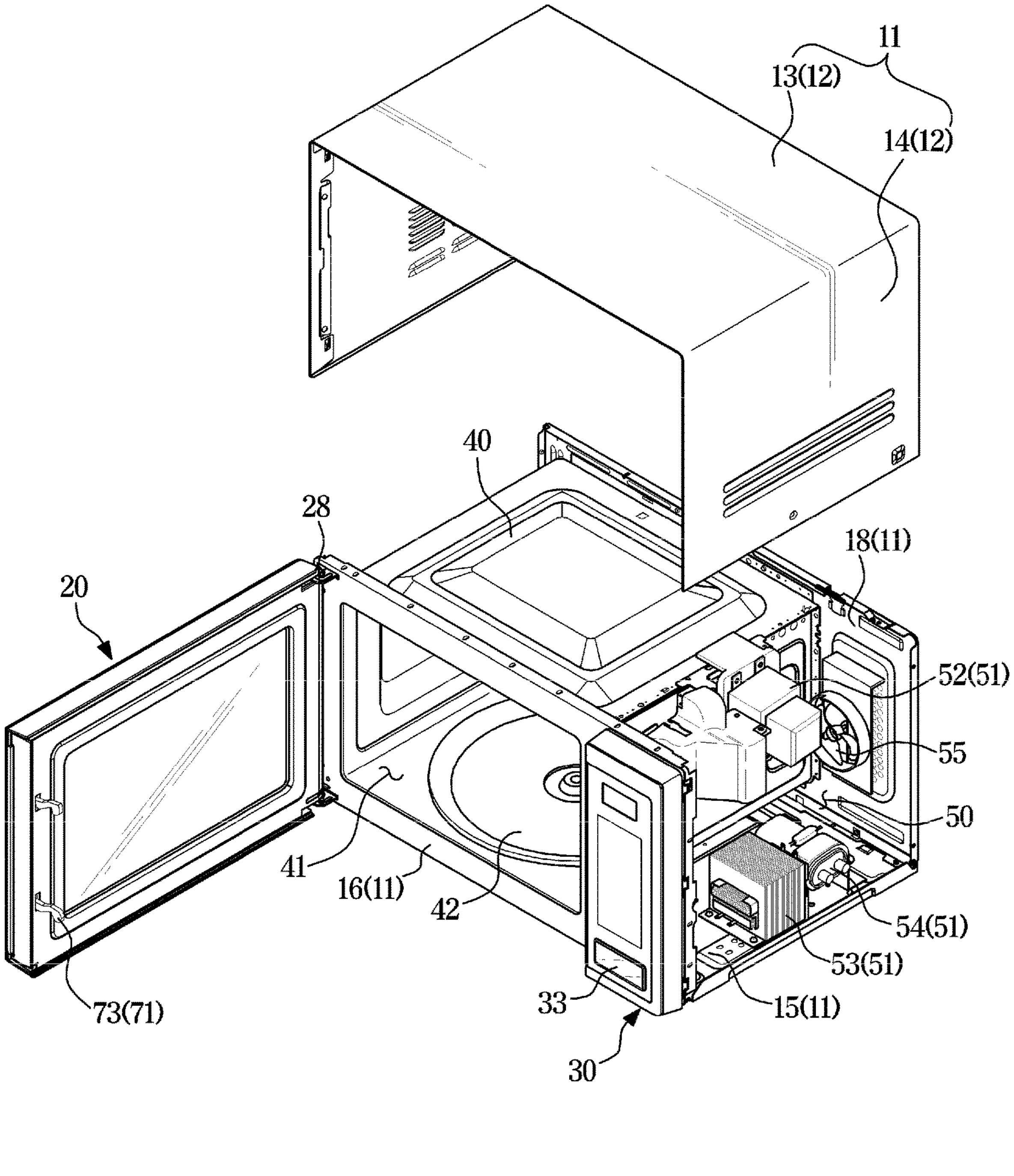
FIG. 2 is an exploded view showing some components of the cooking apparatus shown in FIG. 1.

More specifically, as shown in FIG. 2, a direction in which a cooking room 41 of a cooking apparatus 1 opens may be defined as a front direction, and a rear direction, left and right directions, and up and down directions may be defined based on the front direction.

Hereinafter, an embodiment of the disclosure will be described in detail with reference to the accompanying drawings.

FIG. 1 is a perspective view of a cooking apparatus 1 according to an embodiment of the disclosure. FIG. 2 is an exploded view showing some components of the cooking apparatus 1 shown in FIG. 1.

Referring to FIGS. 1 and 2, a configuration of the cooking apparatus 1 will be described.

The cooking apparatus 1 may include a main body 10 forming an exterior of the cooking apparatus 1. The main body 10 may include a front panel 16, a rear panel 18, a bottom panel 15, and a cover 12. The main body 10 may form the cooking room 41.

More specifically, the main body 10 may include an outer case 11 forming the exterior of the main body 10. The outer case 11 may include the front panel 16, the rear panel 18, the bottom panel 15, and the cover 12.

The outer case 11 and an inner case 40 may be collectively referred to as a housing. The housing may include the outer case 11 and/or the inner case 40.

The inner case 40 may be positioned inside the outer case 11 and form the cooking room 41.

The cover 12 may be positioned between the front panel 16 and the rear panel 18. The cover 12 may include a side panel 14 and a top panel 13. The side panel 14 and the top panel 13 may be integrated into one body. However, the side panel 14 and the top panel 13 may be provided as separate components.

The cooking apparatus 1 may include the inner case 40 forming the cooking room 41. The inner case 40 may be provided inside the main body 10. More specifically, the inner case 40 may be provided inside the outer case 11. The inner case 40 may be substantially in a shape of a rectangular parallelepiped of which one side opens. A machine room 50 may be formed between the main body 10 and the inner case 40.

The cooking apparatus 1 may include a heating source 51 for cooking a cooking material. For example, the heating source 51 may include a magnetron 52 for generating a high frequency to be supplied to inside of the cooking room 41, and a high voltage transformer 53 and/or a high voltage capacitor 54 for applying a high voltage to the magnetron 52. The magnetron 52 and the high voltage transformer 53 and/or the high voltage capacitor 54 may be positioned inside the machine room 50.

The magnetron 52 may be positioned between the outer case 11 and the inner case 40.

The cooking apparatus 1 may include a cooling fan 55 for cooling internal components of the machine room 50. The cooling fan 55 may be positioned inside the machine room 50.

The cooking apparatus 1 may include a tray 42 that is positioned inside the cooking room 41 to accommodate a cooking material thereon.

The cooking apparatus 1 may include a wave guide for guiding a high frequency radiated from the magnetron 52 to the inside of the cooking room 41.

The cooking apparatus 1 may radiate, after a cooking material is accommodated on the tray 42, a high frequency to the inside of the cooking room 41 to cook the cooking material. The cooking apparatus 1 may cook the cooking material accommodated on the tray 42 by intermolecular friction heat generated by repetitive conversion of the molecular array of water contained in the cooking material according to the radiation of the high frequency to the inside of the cooking room 41.

The door 20 may open or close the cooking room 41. The cooking apparatus 1 may include the door 20 coupled to the front panel 16 of the main body 10 to open or close the cooking room 41. The door 20 may be rotatably coupled to the main body 10.

At least one portion of the door 20 may include a transparent or translucent material to show the inside of the cooking room 41.

The cooking apparatus 1 may include a control panel 30 including an inputter 32 for receiving a user's input and/or a display 31 for displaying information. The control panel 30 may be coupled to the front panel 16 of the main body 10. The control panel 30 may be positioned to one side of the door 20. The control panel 30 may be positioned at the other end of the front panel 16, which is opposite to one end of the front panel 16 at which a hinge 28 rotatably supporting the door 20 is located. The control panel 30 may be a component included in the main body 10.

The cooking apparatus 1 may include a button 33 installed in the control panel 30. The cooking apparatus 1 may be configured to open the door 20 at a closed position of closing the cooking room 41 according to an operation of the button 33.

Figure 3:
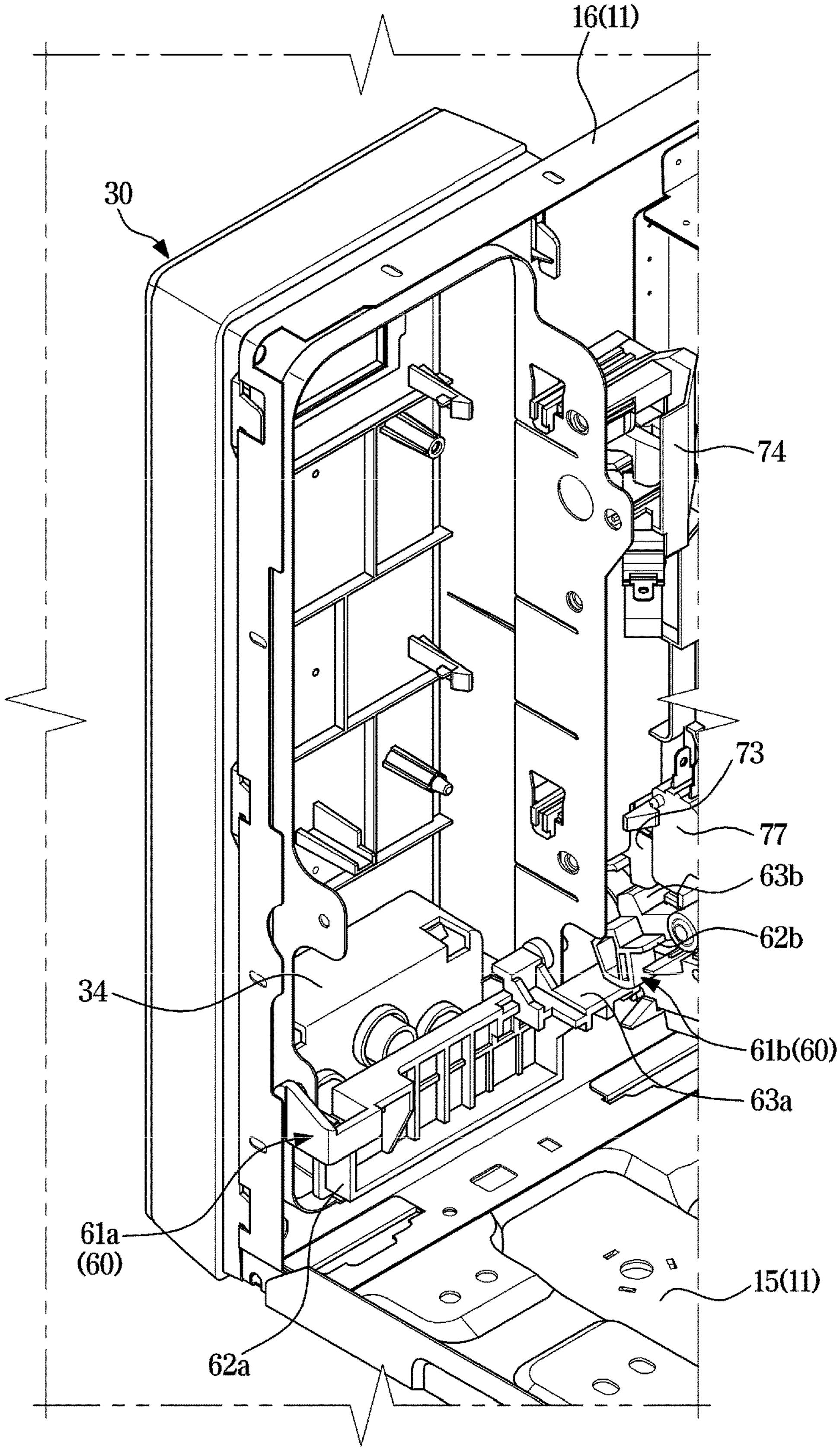
FIG. 3 is a rear view of an opening and closing device provided inside the cooking apparatus shown in FIG. 1.
Figure 4:
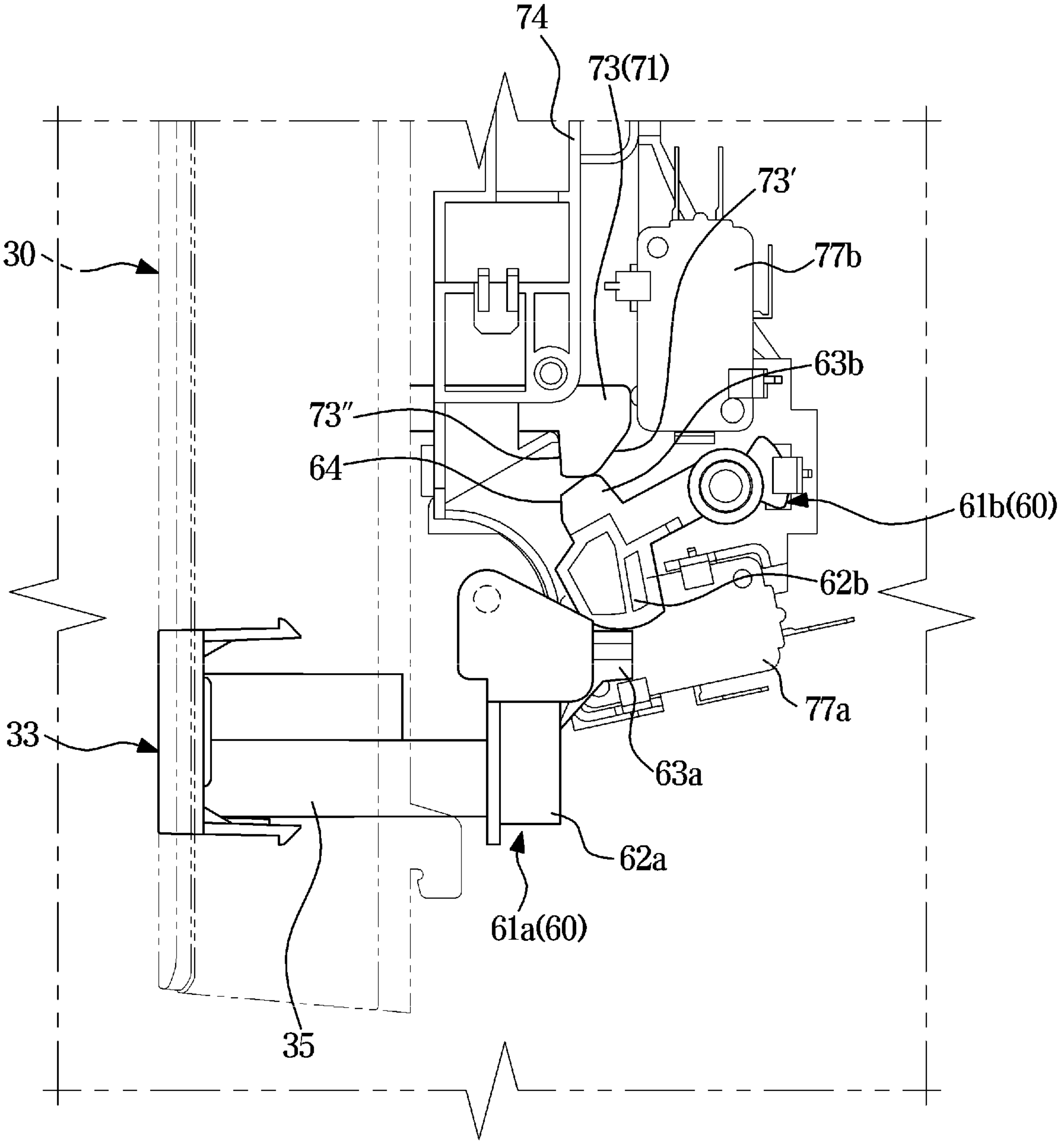
FIG. 4 is a side view showing a state in which the opening and closing device of the cooking apparatus shown in FIG. 3 locks a door.
Figure 5:
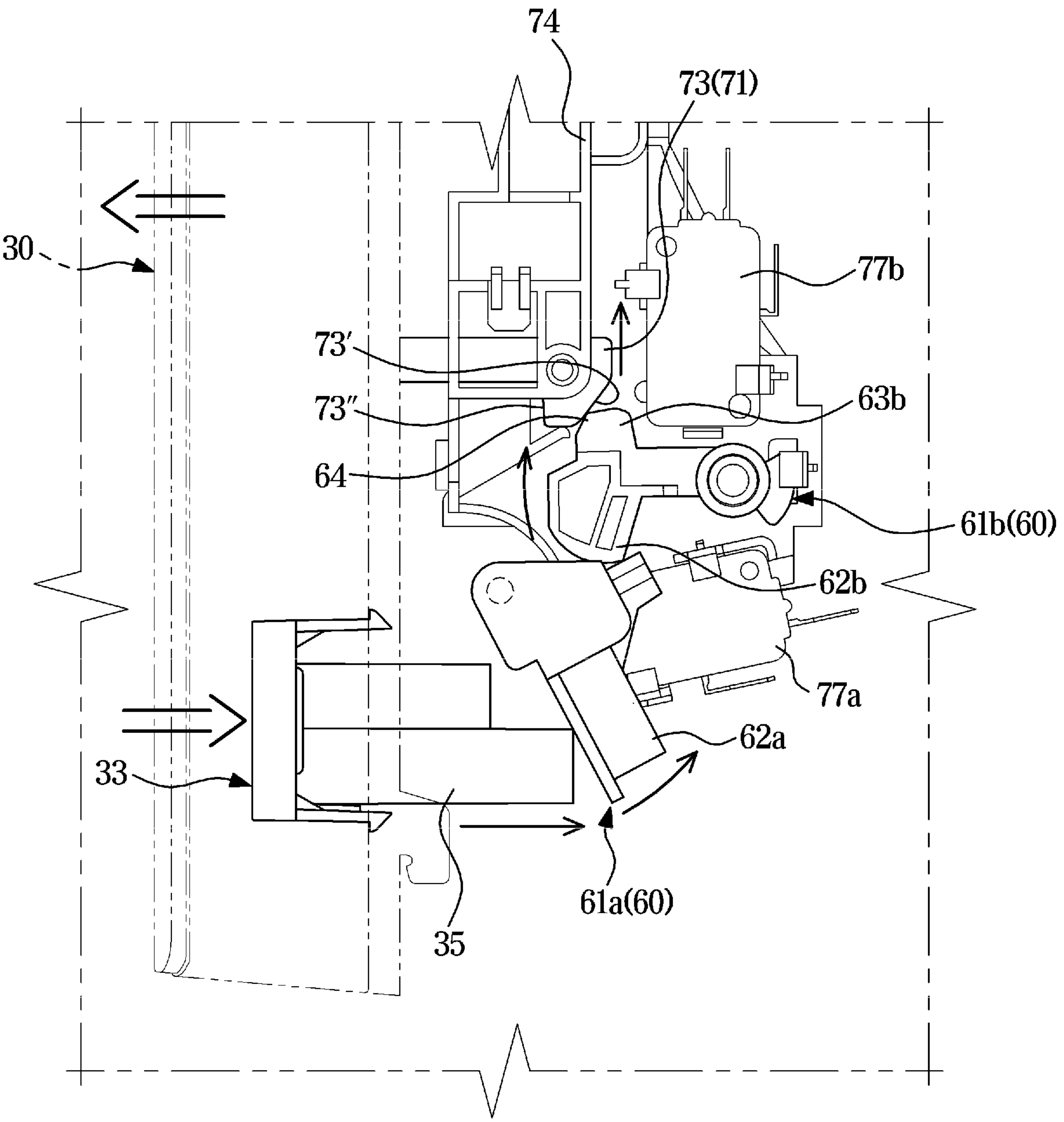
FIG. 5 is a side view showing a state in which the opening and closing device of the cooking apparatus shown in FIG. 4 unlocks the door.
Figure 6:
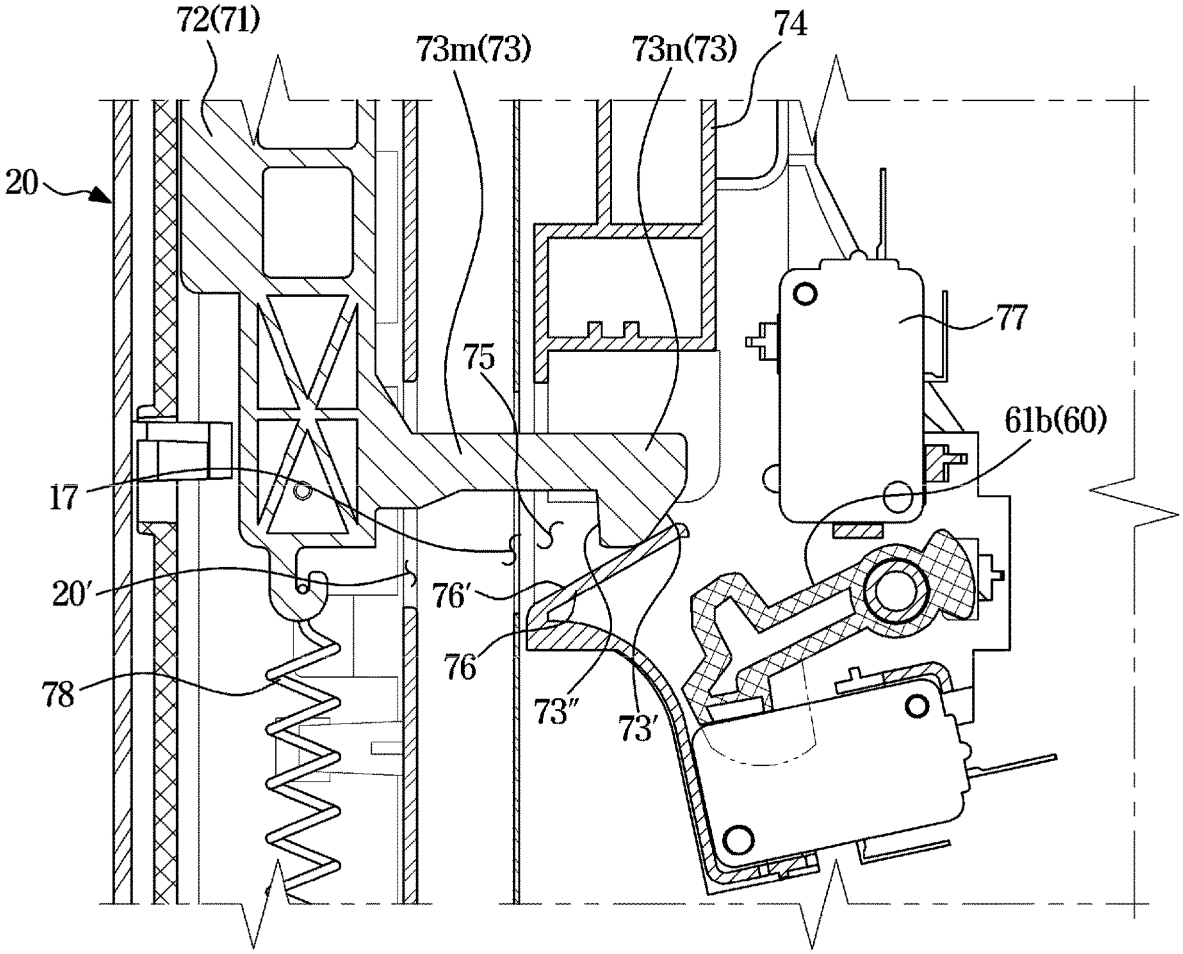
FIG. 6 is a side view showing a state after the opening and closing device of the cooking apparatus shown in FIG. 5 unlocks the door.
Figure 7:
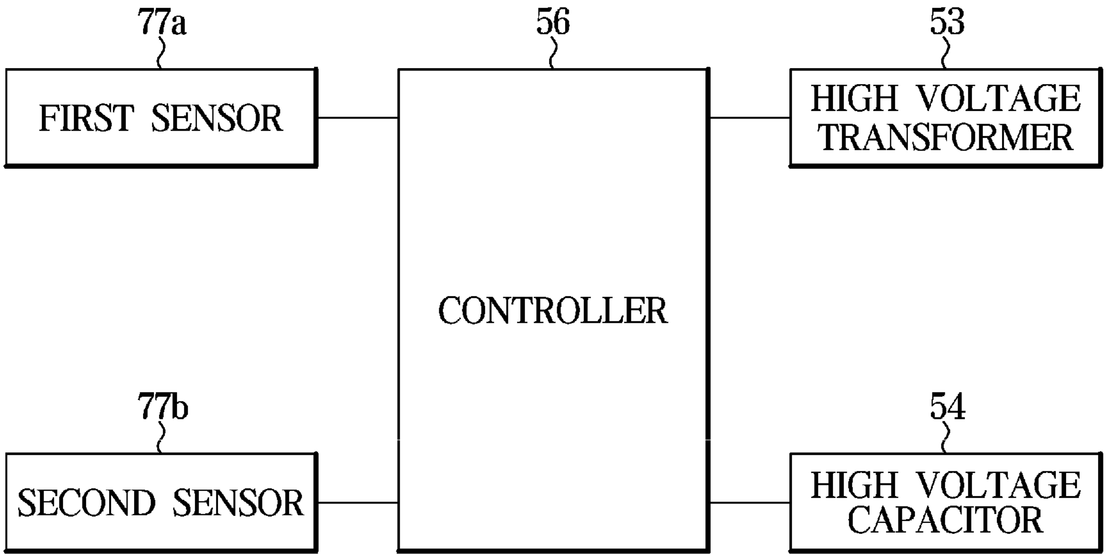
FIG. 7 is a control block diagram showing a connection relationship of a controller for controlling a heating source of the cooking apparatus shown in FIG. 2 based on information sensed by a sensor of the cooking apparatus shown in FIGS. 4 to 6.

FIG. 3 is a rear view of an opening and closing device 60 provided inside the cooking apparatus 1 shown in FIG. 1. FIG. 4 is a side view showing a state in which the opening and closing device 60 of the cooking apparatus 1 shown in FIG. 3 locks the door 20. FIG. 5 is a side view showing a state in which the opening and closing device 60 of the cooking apparatus 1 shown in FIG. 4 unlocks the door 20. FIG. 6 is a side view showing a state after the opening and closing device 60 of the cooking apparatus 1 shown in FIG. 5 unlocks the door 20. FIG. 7 is a control block diagram showing a connection relationship of a controller 56 for controlling a heating source 51 of the cooking apparatus 1 shown in FIG. 2 based on information sensed by a sensor 77 of the cooking apparatus 1 shown in FIGS. 4 to 6.

Components of the button 33 and/or the opening and closing device 60 for opening the door 20 will be described with reference to FIGS. 3 to 7.

The cooking apparatus 1 may include the button 33 for operating the opening and closing device 60. The control panel 30 may include a button installing portion 34 in which the button 33 is installed. The button 33 may be movably installed in the button installing portion 34.

The cooking apparatus 1 may include the opening and closing device 60 configured to selectively limit a movement of the door 20 at a closed position of closing the cooking room 41. The cooking apparatus 1 may include a door latch 73 movably installed in the door 20. The opening and closing device 60 may move the door latch 73.

The door latch 73 may protrude from the door 20 in a rear direction. An end of the door latch 73 may be bent toward an up or down direction. The door latch 73 may be in a shape of a hook.

The opening and closing device 60 may include a first transfer member 61*a* that rotates when pressed by the button 33, and a second transfer member 61*b* that is rotatable according to a rotation of the first transfer member 61*a*.

The first transfer member 61*a* may be rotatably installed in the front panel 16. The first transfer member 61*a* may be rotatably installed in the control panel 30. According to a rotation of the first transfer member 61*a* pressed by a button push portion 35 of the button 33, the first transfer member 61*a* may rotate the second transfer member 61*b*.

The first transfer member 61*a* may include a first transfer portion 62*a* that is pressed by the button 33, and a first push portion 63*a* that rotates the second transfer member 61*b*. The first transfer member 61*a* may rotate when the first transfer portion 62*a* is pressed by the button 33 to cause the first push portion 63*a* to rotate the second transfer member 61*b*. The first transfer portion 62*a* may be in contact with the button 33. The first push portion 63*a* may be in contact with the second transfer member 61*b*.

The second transfer member 61*b* may be rotatably installed in the front panel 16. The second transfer member 61*b* may be rotatably installed in a case 74 of the opening and closing device 60 installed in the front panel 16. The second transfer member 61*b* may move the door latch 73 by rotating by the first transfer member 61*a* to open the door 20.

The second transfer member 61*b* may include a second transfer portion 62*b* that is pressed by the first transfer member 61*a*, and a second push portion 63*b* for moving the door latch 73. The second transfer member 61*b* may be rotated when the second transfer portion 62*b* is pressed by the first transfer member 61*a* to cause the second push portion 63*b* to move the door latch 73. The second transfer portion 62*b* may be in contact with the first push portion 63*a* of the first transfer member 61*a*. The second push portion 63*b* may be in contact with the door latch 73.

The second push portion 63*b* of the second transfer member 61*b* may include a push surface 64 for moving the door latch 73 in a direction in which the door 20 opens upon a rotation of the first transfer member 61*a* and/or the second transfer member 61*b* according to pressing of the button 33. The push surface 64 may be a curved surface that is convex toward the door latch 73. The push surface 64 may lift the door latch 73 and push the door latch 73 in the direction in which the door 20 opens, upon a rotation of the first transfer member 61*a* according to pressing of the button 33. Because the push surface 64 pushes the door latch 73, the door 20 may open enough for a user to be able to grip the door 20.

In other words, the push surface 64 may be formed in an interfering portion 110 (see FIG. 11) such that the interfering portion 110 is moved when pressed by the door 20 while the door 20 moves from an open position to a closed position.

The door latch 73 may include a guide surface that may be in contact with the push surface 64 of the second push portion 63*b* of the second transfer member 61*b*. The guide surface may be pressed by the push surface 64 in the direction in which the door 20 opens, upon a rotation of the first transfer member 61*a* and/or the second transfer member 61*b* according to pressing of the button 33. The guide surface may be a curved surface that is convex toward the second transfer member 61*b*.

More specifically, a latch may include a key door 71 accommodated inside the door 20.

The key door 71 may include a latch body 72 accommodated inside the door 20 and/or the door latch 73 protruding from the latch body 72 toward a rear direction of the door 20.

The latch may include a case 74 coupled to the front panel 16 and accommodating the door latch 73.

The sensor 77 may be positioned inside the main body 10. The door latch 73 may be in contact with the sensor 77 in a case in which the door 20 is located at the closed position.

The latch may include the sensor 77 accommodated inside the case 74. The sensor 77 may include a micro switch. The sensor 77 may be electrically connected with the controller 56, the high voltage transformer 53, or the high voltage capacitor 54. The sensor 77 may be electrically connected with the controller 56 by contacting the door latch 73, and may be electrically disconnected from the controller 56 by not contacting the door latch 73. Accordingly, the sensor 77 may send a signal related to a movement of the door latch 73 to the controller 56. More specifically, the sensor 77 may send a signal related to an open or closed state of the door 20 to the controller 56, according to a movement of the door latch 73.

In the front panel 16, an insertion opening 17 may be formed at a location corresponding to the door latch 73.

In the case 74, a hook opening 75 may be formed at a location corresponding to the insertion opening 17. The door latch 73 may penetrate the hook opening 75. The hook opening 75 may have an area that is larger than a section of a rear end of the door latch 73. The hook opening 75 may have a width that is greater than a width of the door latch 73. The hook opening 75 may have a height that is higher than a height of the door latch 73.

The door latch 73 may contact the sensor 77 located inside the case 74 by penetrating the insertion opening 17 and/or the hook opening 75. The sensor 77 may be in contact with the door latch 73. Upon a contact release between the door latch 73 and the sensor 77 according to opening of the door 20, the controller 56 may control the heating source 51 to stop operating.

The controller 56 may be electrically connected with the sensor 77. The heating source 51 may be electrically connected with the controller 56.

The door latch 73 may have a downwardly bent shape at one end.

In a type of cooking apparatus 1 in which the door 20 opens by the button 33, used as an example in the current embodiment of the disclosure, a rear surface having a bent shape at the rear end of the door latch 73 may be substantially perpendicular to a direction in which the door latch 73 extends toward the rear direction of the door 20.

However, a concept of the disclosure is not limited to the type in which the door 20 opens by the button 33, and in a type in which the door 20 opens by pulling a door handle, the rear surface having the bent shape at the rear end of the door latch 73 may form a substantially obtuse angle with respect to the direction in which the door latch 73 extends toward the rear direction of the door 20.

The case 74 may include a latch guide 76 positioned below and behind the hook opening 75 and inclined upward toward the rear direction.

The door latch 73 may move along the latch guide 76. The door latch 73 may move while in contact with the latch guide 76.

The door latch 73 may include a support portion 73*m* protruding from the door 20 toward the rear direction of the door 20.

The door latch 73 may include a hook portion 73*n* bent from the support portion 73*m* and forming a hook shape. The hook portion 73*n* may extend upward or downward from the support portion 73*m*. However, for convenience of description, the hook portion 73*n* is assumed to extend downward.

The hook portion 73*n* may include a contact surface 73" facing a rear side of the door 20.

In the case in which the door 20 is located at the closed position, the door latch 73 may be in contact with the latch guide 76. More specifically, the door latch 73 may be in contact with one end portion of the latch guide 76. In the case in which the door 20 is located at the closed position, the end portion of the latch guide 76 may be in contact with the support portion 73*m* of the door latch 73. The end portion of the latch guide 76 may be in contact with the support portion 73*m* and the hook portion 73*n* of the door latch 73.

The cooking apparatus 1 may include an elastic member 78 for elastically pressing the door latch 73. The elastic member 78 may press the door latch 73 in the down direction. However, the down direction in which the elastic member 78 presses the door latch 73 may be set according to a bending direction of the hook portion 73*n* of the door latch 73 and an inclination direction of the latch guide 76. Accordingly, a direction in which the elastic member 78 presses the door latch 73 may vary depending on a bending direction of the hook portion 73*n* and an inclination direction of the latch guide 76.

The latch may include the elastic member 78 positioned between the latch body 72 and the door 20 and connecting the latch body 72 with the door 20 to elastically bias the key door 71 downward. Accordingly, a lower end of the door latch 73 may not move over the latch guide 76.

The door latch 73 moving in a front direction by the second transfer member 61*b* may move upward by the opening and closing device 60. According to moving of the door latch 73 over the end of the latch guide 76, the door latch 73 may move in the front direction along the latch guide 76.

In this case, the elastic member 78 may move the door latch 73 downward, and accordingly, the door latch 73 may move downward along the latch guide 76.

The latch guide 76 may include a latch surface 76' that is positioned toward the door latch 73 in the case in which the door 20 is located at the closed position. The latch surface 76' may face the support portion 73*m* of the door latch 73 in the case in which the door 20 is located at the closed position.

Because the latch guide 76 may be inclined, the latch surface 76' may also be inclined. The latch surface 76' may be inclined gradually downward toward the front direction.

The cooking apparatus 1 may include the latch that interworks with opening/closing of the door 20. More specifically, the latch may lock or unlock opening of the door 20. The locking of the opening of the door 20 may include preventing the door 20 from moving, preventing the door 20 from moving while no force is applied thereto, and preventing the door 20 from easily opening by generation of a disturbance unintended by a user.

The elastic member 78 may connect the door latch 73 with the door 20. One end of the elastic member 78 may be coupled to the door latch 73. The other end of the elastic member 78, which is opposite to the one end of the elastic member 78, may be coupled to the door 20. Accordingly, the elastic member 78 may apply an elastic force in a compression direction. Because the door 20 does not substantially move by the elastic member 78, the elastic member 78 may move the door latch 73.

A portion of the door latch 73 may be positioned inside the door 20, and the other portion of the door latch 73 may protrude from the door 20 toward the rear direction.

The door 20 may include a latch opening 20' which the door latch 73 penetrates. The latch opening 20' may be formed in the door 20. The latch opening 20' may correspond to the door latch 73.

The door latch 73 may move in an up-down direction or vertical direction inside the latch opening 20'. The door latch 73 may have a limited movement range by the latch opening 20'. The latch opening 20' may extend in the up-down direction. The movement range of the door latch 73 may be limited by upper and lower ends of the latch opening 20'. An upward movement of the door latch 73 may be interfered with by contacting the upper end of the latch opening 20'. A downward movement of the door latch 73 may be interfered with by contacting the lower end of the latch opening 20'.

The elastic member 78 may be coupled to the portion of the door latch 73, accommodated inside the door 20. The elastic member 78 may be positioned inside the door 20. Because the elastic member 78 is coupled to the door latch 73 and the door 20 positioned below the door latch 73, the elastic member 78 may provide the door latch 73 with an elastic force to move the door latch 73 down.

In the case in which the door 20 is located at the closed position, the door latch 73 may move over the latch guide 76. More specifically, the contact surface 73" formed on the hook portion 73*n* of the door latch 73 may move over the end portion of the latch guide 76 to be located behind the latch guide 76, in the case in which the door 20 is located at the closed position.

Because the door latch 73 receives an elastic force in the down direction, a lower end of the hook portion 73*n* may be positioned at a lower location than an end of the latch guide 76, in the case in which the door 20 is located at the closed position.

According to a movement of the door 20 from the closed position to the open position, the contact surface 73' of the hook portion 73*n* may move in the front direction to contact the end portion of the latch guide 76.

The contact surface 73" of the hook portion 73*n* may be positioned with a preset angle with respect to the support portion 73*m*. The support portion 73*m* may extend toward the rear direction of the door 20. Accordingly, the contact surface 73" may be positioned with a preset angle with respect to the rear direction of the door 20.

The preset angle may be not 90 degrees. The preset angle may be an angle capable of preventing, upon a movement in front direction of the contact surface 73" of the hook portion 73*n*, the latch guide 76 from limiting the movement of the hook portion 73*n*.

The lower end of the hook portion 73*n* may move to an upper location than the end portion of the latch guide 76, the door 20 may open, and the door latch 73 may move in the front direction. Thereafter, the lower end of the hook portion 73*n* may contact the latch guide 76 and accordingly, the door latch 73 may move. The reason may be because the door latch 73 receives an elastic force toward the down direction.

The door latch 73 may move out of the main body 10 by passing through the hook opening 75 and/or the insertion opening 17. Accordingly, the door 20 may move to the open position.

The latch may include the elastic member 78 positioned between the latch body 72 and the door 20 and connecting the latch body 72 with the door 20 to elastically bias the key door 71 downward. Accordingly, the lower end of the door latch 73 may be prevented from moving over the latch guide 76.

The door latch 73 moving in the front direction by the second transfer member 61*b* may move upward by the opening and closing device 60. After the door latch 73 moves over the end of the latch guide 76, the door latch 73 may move in the front direction along the latch guide 76.

In this case, because the elastic member 78 moves the door latch 73 downward, the door latch 73 may move downward along the latch guide 76.

Referring to FIG. 7, the cooking apparatus 1 may include the sensor 77. The sensor 77 may include a first sensor 77*a* and/or a second sensor 77*b*. The first sensor 77*a* may be in contact with the second transfer member 61*b*. The second sensor 77*b* may be in contact with the door latch 73. The first sensor 77*a* may be released from the second transfer member 61*b* according to a rotation of the second transfer member 61*b*, and upon spacing of the first sensor 77*a* from the second transfer member 61*b*, the first sensor 77*a* may transfer a signal for stopping operating the heating source 51 to the controller 56. The second sensor 77*b* may be released from the door latch 73 according to a movement of the door latch 73, and upon spacing of the second sensor 77*b* from the door latch 73, the second sensor 77*b* may transfer a signal for stopping operating the heating source 51 to the controller 56. The controller 56 may control the high voltage transformer 53 and/or the high voltage capacitor 54.

That is, the cooking apparatus 1 may include the sensor 77 that may be in contact with the door latch 73, the controller 56 electrically connected with the sensor 77, and the heating source 51 electrically connected with the controller 56. Upon spacing of the door latch 73 from the sensor 77 according to an operation of the opening and closing device 60, the controller 56 may control the heating source 51 to stop operating.

Thereby, a cause such as a high frequency generated from the heating source 51, which may injure a user upon opening of the door 20, may be prevented.

In addition, the opening and closing device 60 may lock or unlock the door 20 upon closing of the cooking room 41 by the door 20. The door latch 73 may be provided in the door 20. The door latch 73 may be movable by the opening and closing device 60. The sensor 77 may be in contact with the door latch 73. The controller 56 may be electrically connected with the sensor 77. The sensor 77 may be positioned inside the main body 10, and at the closed position of the door 20, the door latch 73 may be in contact with the sensor 77.

Figure 8:
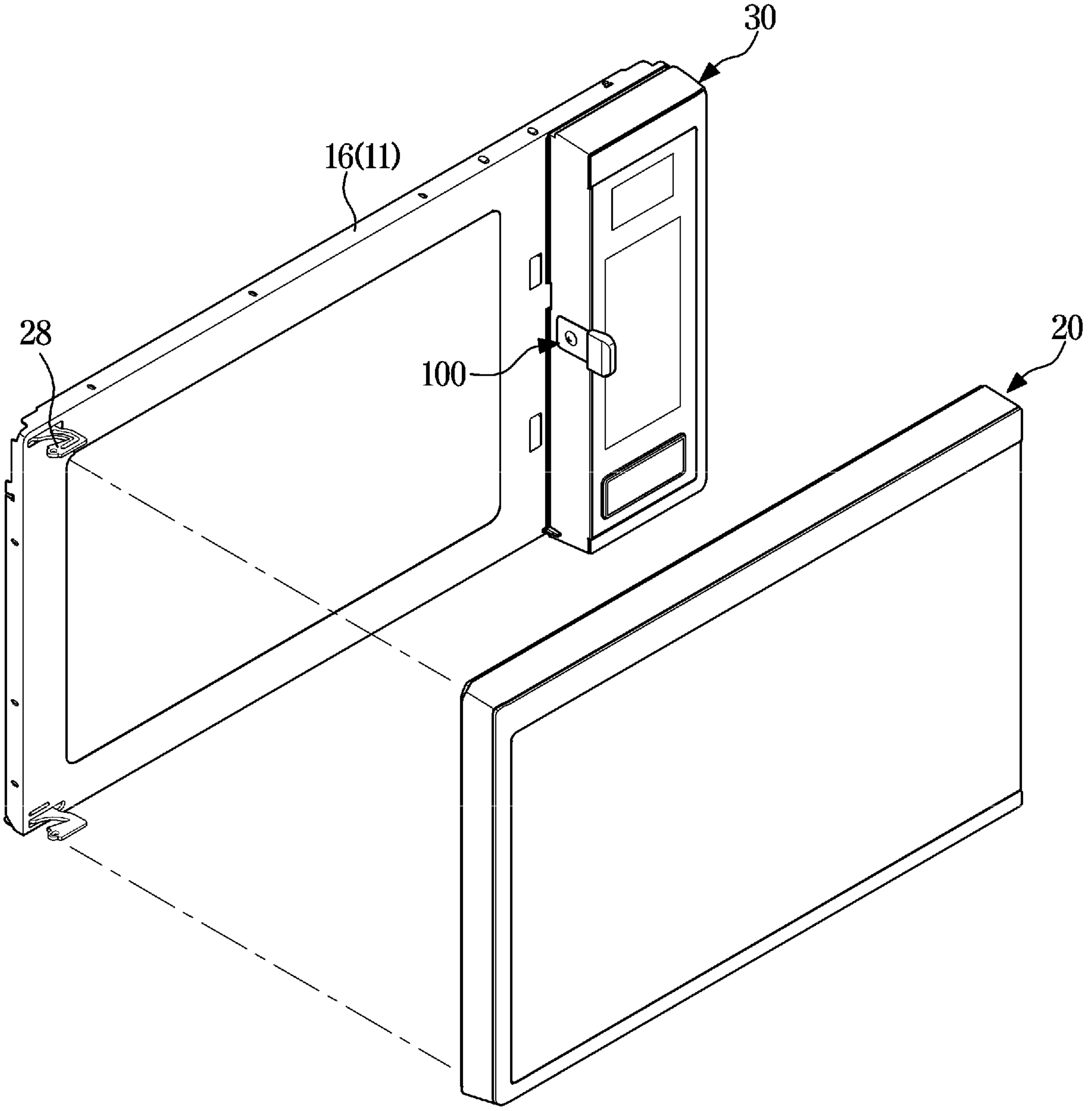
FIG. 8 is a partially exploded view of components adjacent to a door in the cooking apparatus shown in FIG. 1.

FIG. 8 is a partially exploded view of components adjacent to the door 20 in the cooking apparatus 1 shown in FIG. 1.

Components provided in a front portion of the cooking apparatus 1 will be described with reference to FIG. 8.

In the front portion of the cooking apparatus 1, the door 20, the front panel 16, the control panel 30, and a locker included in a door lock 100 may be provided.

The front panel 16 may be positioned in the front portion of the cooking apparatus 1. The front panel 16 may be provided in front of the outer case 11 to form a front exterior of the outer case 11. Because the outer case 11 forms the exterior of the main body 10, the front panel 16 may form a front exterior of the main body 10.

The door 20 may be positioned in front of the front panel 16. The door 20 may be positioned adjacent to a left or right side of the front panel 16. The reason may be because the door 20 is pivotally coupled to the front panel 16 by a hinge 28.

The door 20 may be substantially in a shape of a rectangular parallelepiped. A height of the door 20 may be substantially equal to a height of the front panel 16. Accordingly, the door 20 may cover at least one area of the front portion of the front panel 16.

A side surface of the door 20 may be a flat surface.

The control panel 30 may be positioned in front of the front panel 16. The control panel 30 may be adjacent to the door 20. More specifically, the control panel 30 may include a locking surface 36 (see FIG. 13) that faces or is oriented towards the door 20. The locking surface 36 will be described in detail with reference to the related drawing, below.

The control panel 30 may be positioned adjacent to the right or left side of the front panel 16, in which the door 20 is not positioned. Accordingly, the control panel 30 may cover a front side of the front panel 16 together with the door 20.

The front panel 16 may include a control opening that opens in a front-rear direction at a location at which the control panel 30 is coupled to the front panel 16.

As described above, the machine room 50 may be provided behind the front panel 16. Electronic parts positioned inside the machine room 50 may be connected with the control panel 30 to receive signals. The control panel 30 may be positioned in front of the machine room 50 to be connected with the electronic parts positioned in the machine room 50 by a shorter wire.

The main body 10 may include the outer case 11 to which the door 20 is rotatably coupled. A deformable portion 120 (see FIG. 9) may be mounted on the outer case 11.

For this, the front panel 16 may include an opening through which a wire passes to be connected with the electronic parts positioned inside the machine room 50, to correspond to the location at which the control panel 30 is coupled to the front panel 16.

Because the inner case 40 forms the cooking room 41, the machine room 50 may be provided outside the inner case 40. Because the outer case 11 forms the exterior of the main body 10, the machine room 50 may be positioned between the outer case 11 and the inner case 40. Accordingly, the machine room 50 may be formed between a side surface of the inner case 40 and the outer case 11. Accordingly, the control panel 30 may be positioned adjacent to the left or right side of the front panel 16.

The control panel 30 may be substantially in a shape of a rectangular parallelepiped.

As described above, the cooking apparatus 1 may operate to heat a cooking material located inside the cooking room 41. While the cooking material is heated, inside air of the cooking room 41 may be heated together with the cooking material or by the cooking material. That is, while the cooking apparatus 1 operates, inside air of the cooking room 41 may be heated. In a case in which a user opens the door 20 after the inside air of the cooking room 41 is heated, the heated air may flow toward the user. The user may be burned by the heated air.

To prevent such a burn, the door 20 may need to be opened by two or more operations.

For this, the cooking apparatus 1 may include the door lock 100.

The door lock 100 may interfere with a movement of the door 20. By the door lock 100, the door 20 may move from the closed position of closing the cooking room 41 to an interference position at which the door 20 is interfered by the door lock 100. In other words, the door lock 100 may interfere with opening of the door 20.

The interference position may be a position at which the door 20 is interfered by the door lock 100, while attempting to open the door 20 although the door 20 does not open the front side of the cooking room 41. The interference position may be a certain position among positions at which the door 20 opens. However, the interference position may be a state in which the door 20 is not completely open.

According to a movement of the door 20 to the interference position, the heated inside air of the cooking room 41 may leak out. However, because the cooking room 41 is not completely open, the user may be unable to take out the cooking material accommodated inside the cooking room 41.

In a case in which the door 20 is at the interference position, the door 20 may move to the open position by releasing the interference of the door lock 100 with respect to the door 20. The open position may be a state in which the cooking room 41 is completely open. The open position may be a state in which the front side of the cooking room 41 is open.

While the interference of the door lock 100 with respect to the door 20 is released at the interference position of the door 20, high heat of the cooking room 41 may be discharged out of the cooking apparatus 1. Accordingly, the user may be prevented from injury caused by hot air in the cooking room 41 although the user moves the door 20 to the open position after the cooking material is cooked.

For the door lock 100 to move the door 20 between the closed position and the interference position, the door lock 100 may be located at a first position of interfering with the door 20. The door lock 100 may be located to a second position for moving the door 20 from the interference position to the open position at which the interference with the door lock 100 is released.

In a case in which the interfering portion 110 is located at the first position, the door 20 may be movable between the closed position of closing the cooking room 41 and the interference position at which opening of the door 20 is limited by the interference portion 110.

In a case in which the interfering portion 110 is located at the second position, the door 20 may be movable between the closed position and the open position of opening the cooking room 41.

The heating source 51 may stop operating according to a movement of the door 20 from the closed position to the open position.

The door lock 100 may be coupled to the control panel 30. The door lock 100 may be coupled to the control panel 30 to limit a movement of the door 20.

To limit a movement of the door 20, the door lock 100 may be in contact with the door 20. The door 20 may be coupled to the locking surface 36 of the control panel 30, the locking surface 36 facing the door 20 to be coupled to the control panel 30 while in contact with the door 20.

Because the door 20 is coupled to one side of the front panel 16 by the hinge 28, the door 20 may rotate with respect to the hinge 28. By the rotation of the door 20, a rotational movement path of the door 20 may be provided. The door lock 100 may be located on the rotational movement path of the door 20 to interrupt a movement of the door 20.

Hereinafter, the door lock 100 will be described in more detail.

Figure 9:
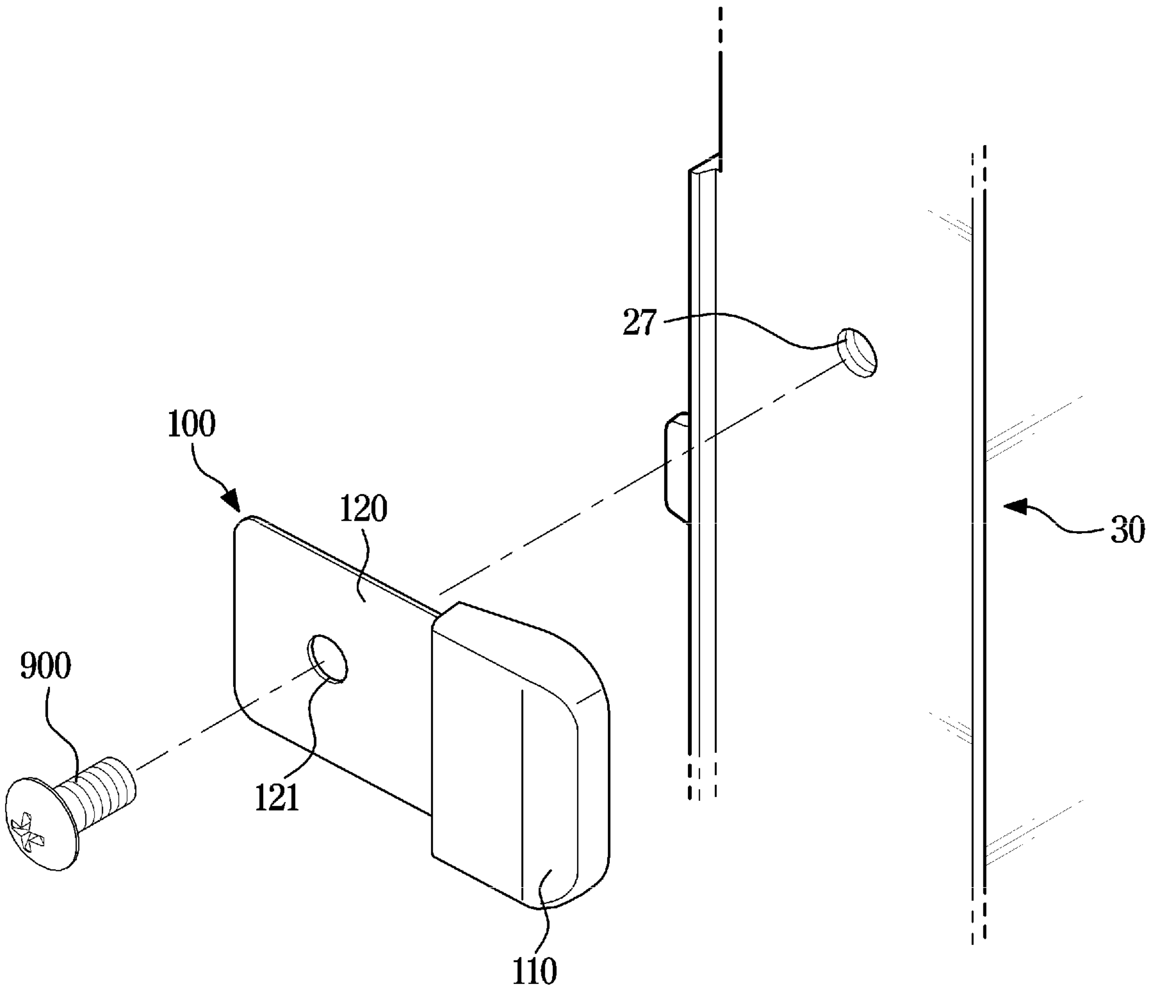
FIG. 9 is an exploded view showing a state in which a door lock is coupled to a control panel in the cooking apparatus shown in FIG. 8.

FIG. 9 is an exploded view showing a state in which the door lock 100 is coupled to the control panel 30 in the cooking apparatus 1 shown in FIG. 8.

Referring to FIG. 9, an example about a detailed shape of the door lock 100 and a method of coupling the door lock 100 with the control panel 30 will be described.

The door lock 100 may include the interfering portion 110 configured to interfere with opening of the door 20. The interfering portion 110 may be moved to the first position of interfering with opening of the door 20 or the second position of allowing opening of the door 20. The deformable portion 120 may elastically support the interfering portion 110 such that the interfering portion 110 is biased toward the first position.

In a case in which the interfering portion 110 is located at the first position, the door 20 may be movable between the closed position of closing the cooking room 41 and the interference position at which opening of the door 20 is limited by the interfering portion 110.

In a case in which the interfering portion 110 is located at the second position, the door 20 may be movable between the closed position and the open position of opening the cooking room 41.

The door lock 100 may include the deformable portion 120 for elastically supporting the interfering portion 110 such that the interfering portion 110 is movable.

The door lock 100 may include the interfering portion 110 that interferes with the door 20. The interfering portion 110 may be located on a movement path of the door 20 to limit a movement of the door 20.

The door lock 100 may include the deformable portion 120 for elastically supporting the interfering portion 110. The deformable portion 120 may extend from one end of the interfering portion 110 toward the front panel 16.

In other words, the door lock 100 may include the interfering portion 110 for interfering with opening of the door 20 and/or the deformable portion 120 for elastically supporting the interfering portion 110 such that the interfering portion 110 is movable.

The interfering portion 110 may be movable to the first position of interfering with opening of the door 20 or the second position of allowing opening of the door 20.

The deformable portion 120 may elastically support the interfering portion 110 such that the interfering portion 110 is biased toward the first position.

Accordingly, as long as a user applies no intended force to the interfering portion 110, the interfering portion 110 may return to the first position to continue to interfere with the door 20.

In the case in which the interfering portion 110 is located at the first position, the door 20 may be movable between the closed position of closing the cooking room 41 and the interference position of limiting opening of the door 20 by the interfering portion 110.

In the case in which the interfering portion 110 is located at the second position, the door 20 may be movable between the closed position and the open position of opening the cooking room 41.

In this case, the second position of the interfering portion 110 may be more spaced from the door 20 than the first position of the interfering portion 110.

The deformable portion 120 may be installed on the control panel 30. More specifically, the deformable portion 120 may be coupled to the locking surface 36 of the control panel 30. Accordingly, the deformable portion 120 may be adjacent to the door 20 to easily interwork with the door 20.

A coupling hole 121 may be formed in the deformable portion 120.

A through hole 27 may be formed to correspond to the coupling hole 121 in the locking surface 36 of the control panel 30.

A coupling member 900 may be coupled by penetrating the coupling hole 121 and the through hole 27. By the coupling of the coupling member 900, the door lock 100 may be coupled to the control panel 30.

The coupling member 900 may be a screw, a rivet, etc.

The coupling of the coupling member 900 may be released by a decoupling tool such as a screwdriver that is kept in general homes. Accordingly, a user who does not want the door lock 100 may separate the door lock 100 from the control panel 30 by decoupling the coupling member 900.

Because the door lock 100 may be exposed in front of the door 20, the door lock 100 may deteriorate an aesthetic impression of the cooking apparatus 1. To improve the aesthetic impression of the cooking apparatus 1, the user may remove the door lock 100 from the cooking apparatus 1. Accordingly, the user may use the cooking apparatus 1 from which the door lock 100 has been removed.

The door lock 100 will be described in more detail, below.

Figure 10:
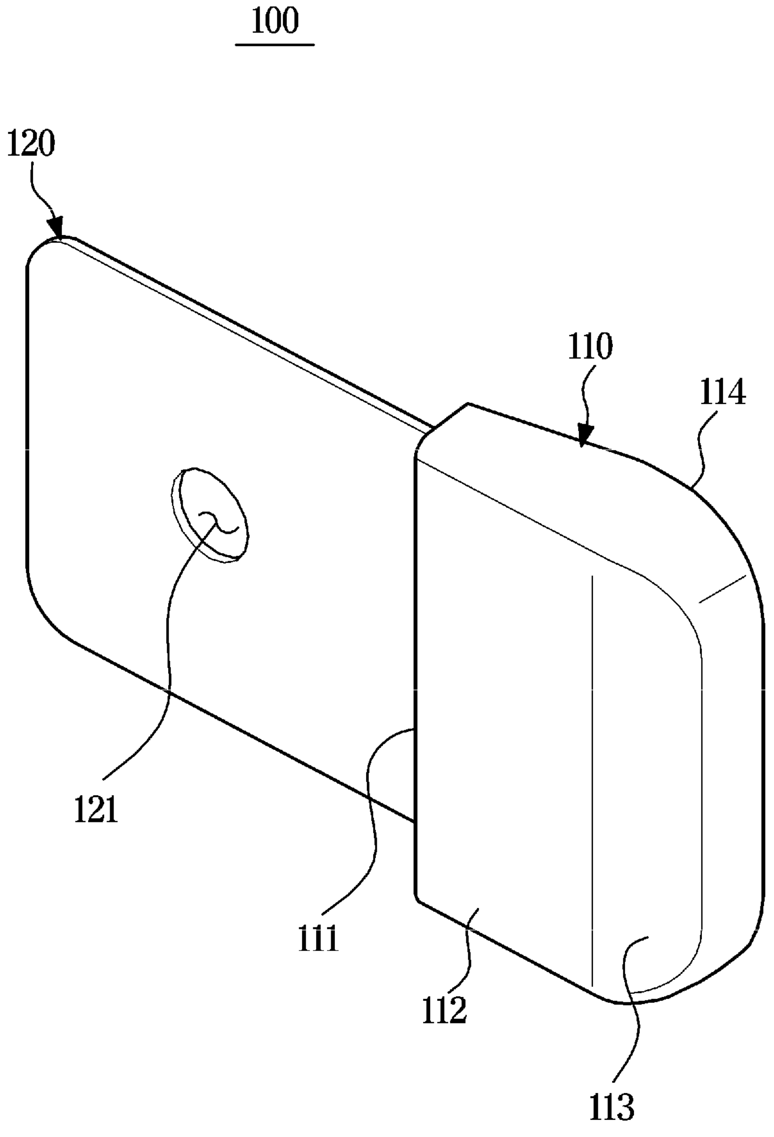
FIG. 10 is a perspective view of the door lock of the cooking apparatus shown in FIG. 9.

FIG. 10 is a perspective view of the door lock 100 of the cooking apparatus 1 shown in FIG. 9.

An example about a shape of the door lock 100 will be described in detail with reference to FIG. 10.

The interfering portion 110 may have a shape extending in a left-right direction and having a width in the up-down direction.

The interfering portion 110 may be positioned toward the control panel 30 and include a holding surface 114 to allow a user to easily grip the interfering portion 110. The holding surface 114 may have a shape inclined to be closer to the control panel 30 at a more distant location from the front panel 16 and then inclined away from the control panel 30.

The interfering portion 110 may include an operation surface 113 positioned at a front side of the interfering portion 110 in a direction away from the control panel 30 and guiding the door 20 upon a movement of the door 20 from the open position to the closed position. The operation surface 113 may extend from the front side toward the rear direction and be inclined in a direction away from the control panel 30. The operation surface 113 will be described in detail with reference to the related drawing, below.

The interfering portion 110 may include an extension surface 112 extending from the operation surface 113 toward the front panel 16 and inclined toward the control panel 30. By the inclination, the user may easily grip the interfering portion 110. Also, the user's hand gripping the extension surface 112 and a front portion of the holding surface 114 may be prevented from slipping behind the extension surface 112 and the front portion of the holding surface 114, and accordingly, the user may easily grip the interfering portion 110.

The interfering portion 110 may include a support surface 111 positioned at a rear portion to contact the door 20. The support surface 111 may extend in the up-down direction and have a width in the left-right direction. The support surface 111 may contact a front surface of the door 20 and be provided in the rear portion of the interfering portion 110.

The interfering portion 110 may include a plastic injection mold to have the above-described shape.

The deformable portion 120 may be in a shape of a flat plate having a certain width in the up-down direction and extending in the front-rear direction. Accordingly, the deformable portion 120 may be bent in the left-right direction.

The deformable portion 120 may include a metal material to be bent.

Hereinafter, bending of the deformable portion 120 will be described in detail.

Figure 11:
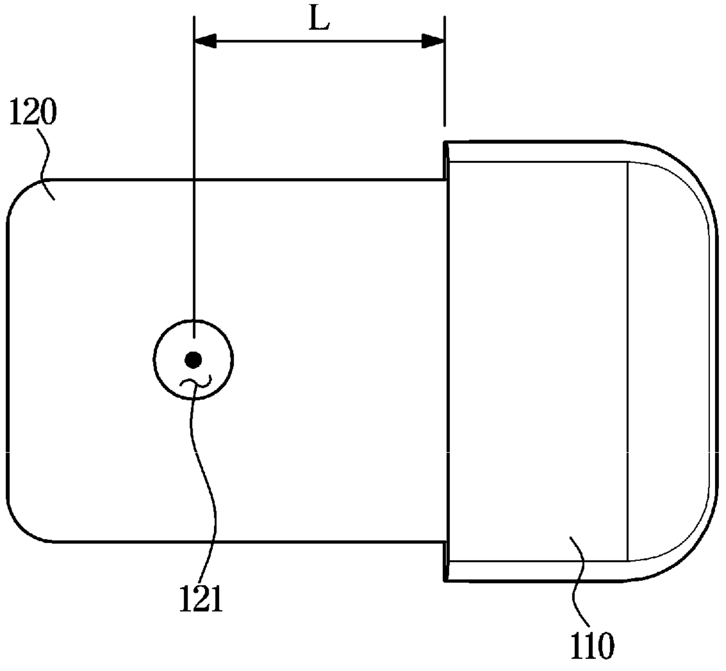
FIG. 11 is a side view of the door lock of the cooking apparatus shown in FIG. 10.

FIG. 11 is a side view of the door lock 100 of the cooking apparatus 1 shown in FIG. 10.

Bending of the deformable portion 120 will be described with reference to FIG. 11.

For convenience of description, it may be assumed that the deformable portion 120 does not extend out of the locking surface 36 of the control panel 30. However, the deformable portion 120 may extend out of the locking surface 36 of the control panel 30, and a concept of the disclosure may also be applied to an embodiment of the disclosure in which the deformable portion 120 extends out of the locking surface 36 of the control panel 30.

To deform the door lock 100, a force may be applied to the interfering portion 110. At this time, a torque for bending the deformable portion 120 may be calculated. Because the coupling hole 121 is a fixing point, a magnitude of the torque may be obtained by calculating a cross product of a magnitude of a force applied to the interfering portion 110 with respect to the coupling hole 121.

To locate the door lock 100 at a desired position with a small force, a location at which a force is applied may need to be distant from a location of the coupling hole 121. Accordingly, the longer length of the deformable portion 120, the better.

However, this may be a view of a force. A long length of the deformable portion 120 may have a great influence on the appearance of the cooking apparatus 1 to lower an aesthetic sense. Also, because the deformable portion 120 having a long length sways from side to side even with a small force, it may be difficult to locate the interfering portion 110 at the second position only in a desired situation.

Figure 12:
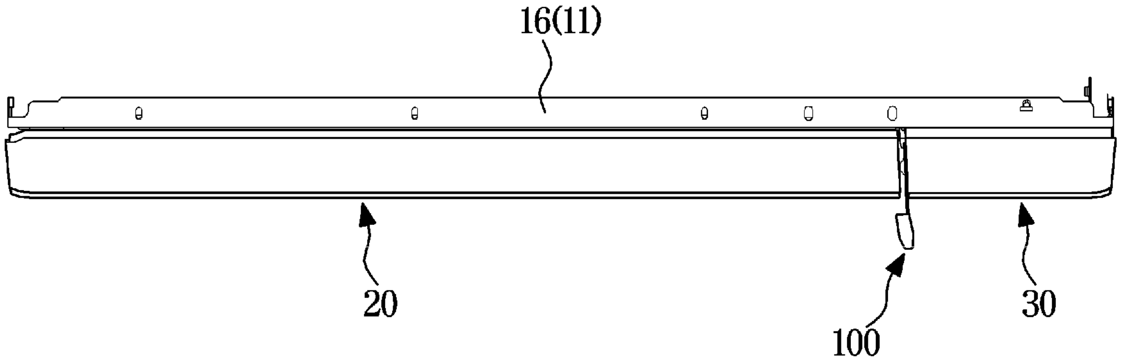
FIG. 12 is a top view of the components adjacent to the door of the cooking apparatus shown in FIG. 8.
Figure 13:
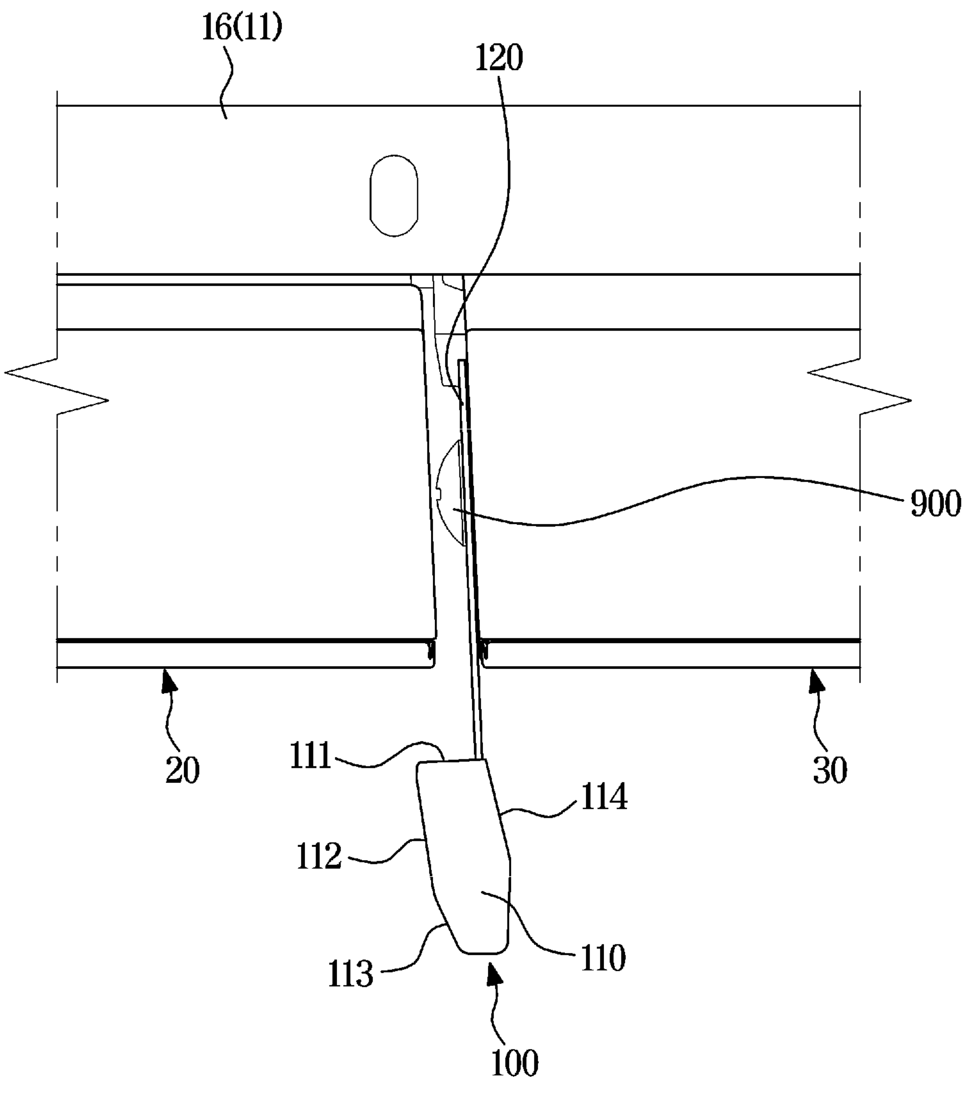
FIG. 13 is an enlarged view of components around the door lock of the cooking apparatus shown in FIG. 12.

FIG. 12 is a top view of the components adjacent to the door 20 of the cooking apparatus 1 shown in FIG. 8. FIG. 13 is an enlarged view of components around the door lock 100 of the cooking apparatus 1 shown in FIG. 12.

An interaction of the door 20 with the door lock 100 at the closed position of the door 20 will be described with reference to FIGS. 12 and 13.

The front panel 16 may be positioned in the front portion of the cooking apparatus 1. The door 20 may be coupled to one side of the front panel 16 by the hinge 28, and the other side of the front panel 16 may be coupled to the control panel 30.

The door 20 may be adjacent to the control panel 30 in such a way as to face the control panel 30. A gap may be formed between the door 20 and the control panel 30.

The door lock 100 may be positioned between the door 20 and the control panel 30, and coupled to a surface of the control panel 30, the surface facing the door 20. In other words, the door lock 100 may be positioned in the gap formed between the door 20 and the control panel 30. More specifically, the deformable portion 120 included in the door lock 100 may be provided in the gap located between the door 20 and the control panel 30.

The deformable portion 120 of the door lock 100 may extend while in contact with the surface of the control panel 30. The deformable portion 120 may extend in a direction in which the locking surface 36 of the control panel 30 extends.

The deformable portion 120 of the door lock 100 may be deformable. In a case in which an entire surface of the deformable portion 120 is fixed to the control panel 30 while in contact with the control panel 30, the deformable portion 120 may be non-deformable. Accordingly, the deformable portion 120 may extend out of the locking surface 36 of the control panel 30 to protrude in the front direction. In a case in which a front surface of the control panel 30 and the front surface of the door 20 are on the same plane, the deformable portion 120 may extend out of the door 20 and the control panel 30 to protrude in the front direction.

In the case in which the door 20 is located at the closed position, the interfering portion 110 of the door lock 100 may be located in front of the door 20. Upon a movement of the door 20 from the closed position to the open position, the door 20 may move toward the front direction, and the movement of the door 20 may be limited by the interfering portion 110.

More specifically, the support surface 111 of the interfering portion 110 may be positioned ahead of the front surface of the door 20. The reason may be because according to opening and a movement in front direction of the door 20, the front surface of the door 20 contacts the support surface 111. The support surface 111 may support the door 20 in a direction in which the door 20 closes the cooking room 41 at the interference position of the door 20.

The interfering portion 110 of the door lock 100 may extend in the left-right direction. The interfering portion 110 may extend from the deformable portion 120 toward the door 20. Because the door 20 performs a rotational motion by coupling with the hinge 28, the interfering portion 110 may extend to within a rotational radius of the door 20. Accordingly, while the door 20 rotates and opens, the rotation of the door 20 may be interfered by the interfering portion 110.

More specifically, the support surface 111 of the interfering portion 110 of the door lock 100 may extend to within the rotational radius of the door 20. Accordingly, the support surface 111 may interfere with the rotation of the door 20.

Figure 14:
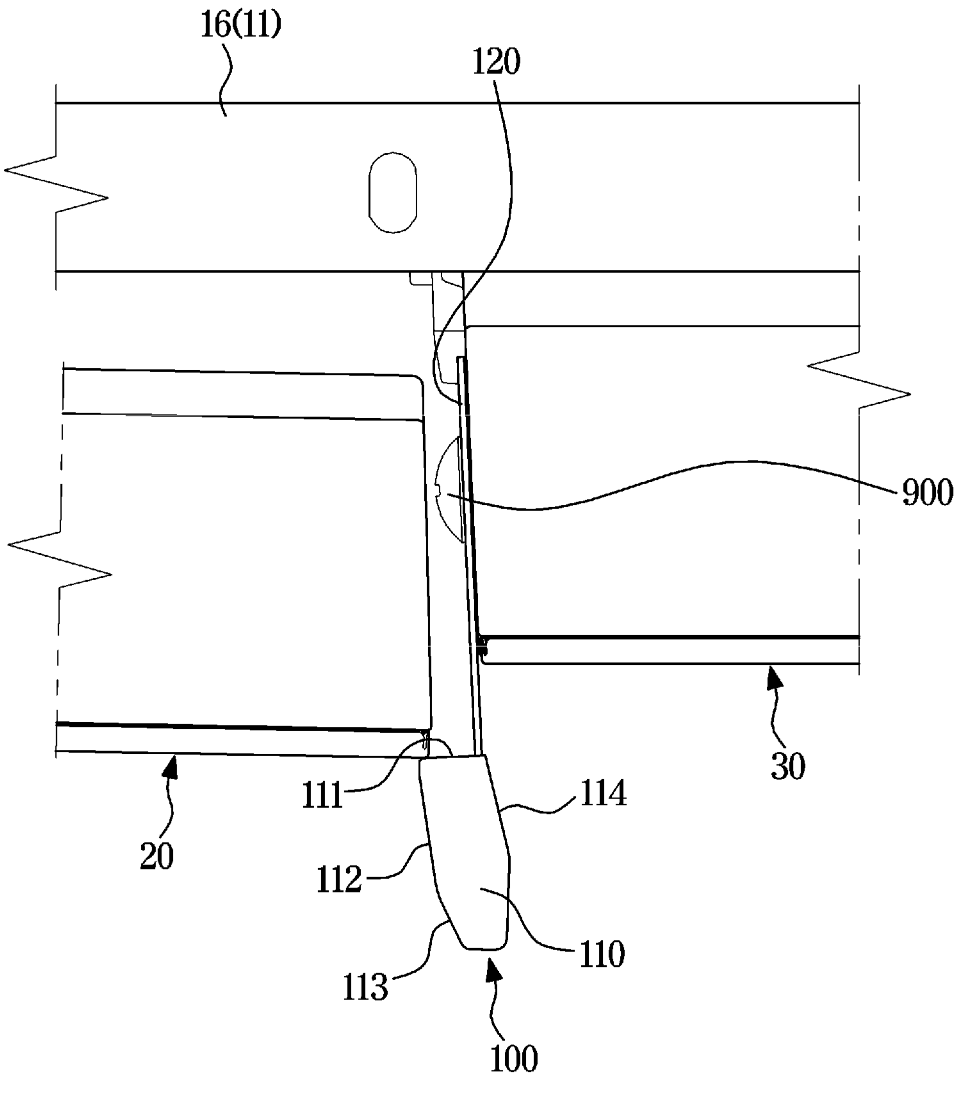
FIG. 14 is an enlarged view showing a state in which the door of the cooking apparatus shown in FIG. 13 is located at an interference position.

FIG. 14 is an enlarged view showing a state in which the door 20 of the cooking apparatus 1 shown in FIG. 13 is located at the interference position.

An interaction of the door 20 with the door lock 100 while the door 20 moves to the interference position will be described with reference to FIG. 14, below.

As described above, according to a user's operation of pressing the button 33 of the cooking apparatus 1, the door 20 may open. In the cooking apparatus 1 including a door handle, instead of the button 33, the door 20 may open by an operation of pulling the door handle. Such an operation required to open the door 20 may be referred to as a first operation.

Accordingly, at least one portion of the door 20 may move in the front direction of the door 20.

According to a movement of the door 20 to the interference position, the door 20 may contact the interfering portion 110 of the door lock 100. Accordingly, opening of the door 20 may be limited.

More specifically, at the interference position of the door 20, the front surface of the door 20 may contact the support surface 111 included in the interfering portion 110 of the door lock 100. Because the support surface 111 extends in the left-right direction, the front surface of the door 20 may contact the support surface 111, and a movement in front direction of the door 20 may be limited. Accordingly, by the support surface 111 of the door lock 100 contacting the door 20, the door 20 may be prevented from opening.

At the interference position of the door 20, the door 20 may be prevented from opening by the door lock 100. In other words, in the case in which the interfering portion 110 of the door lock 100 is at the first position, the door 20 may move from the closed position to the interference position. Because the interfering portion 110 of the door lock 100 limits a movement of the door 20 only up to the interference position of the door 20, the door 20 may freely move from the closed position of the door 20 to the interference position of the door 20.

However, because the interference position of the door 20 is a position at which the door 20 opens although the front side of the cooking room 41 is not open, a movement of the door 20 from the closed position of the door 20 to the interference position of the door 20 may be a short distance movement.

Because the front side of the cooking room 41 is not open although the door 20 is located at the interference position, a user may need to move the door 20 to a completely open state to take out a cooking material accommodated in the cooking room 41.

Figure 15:
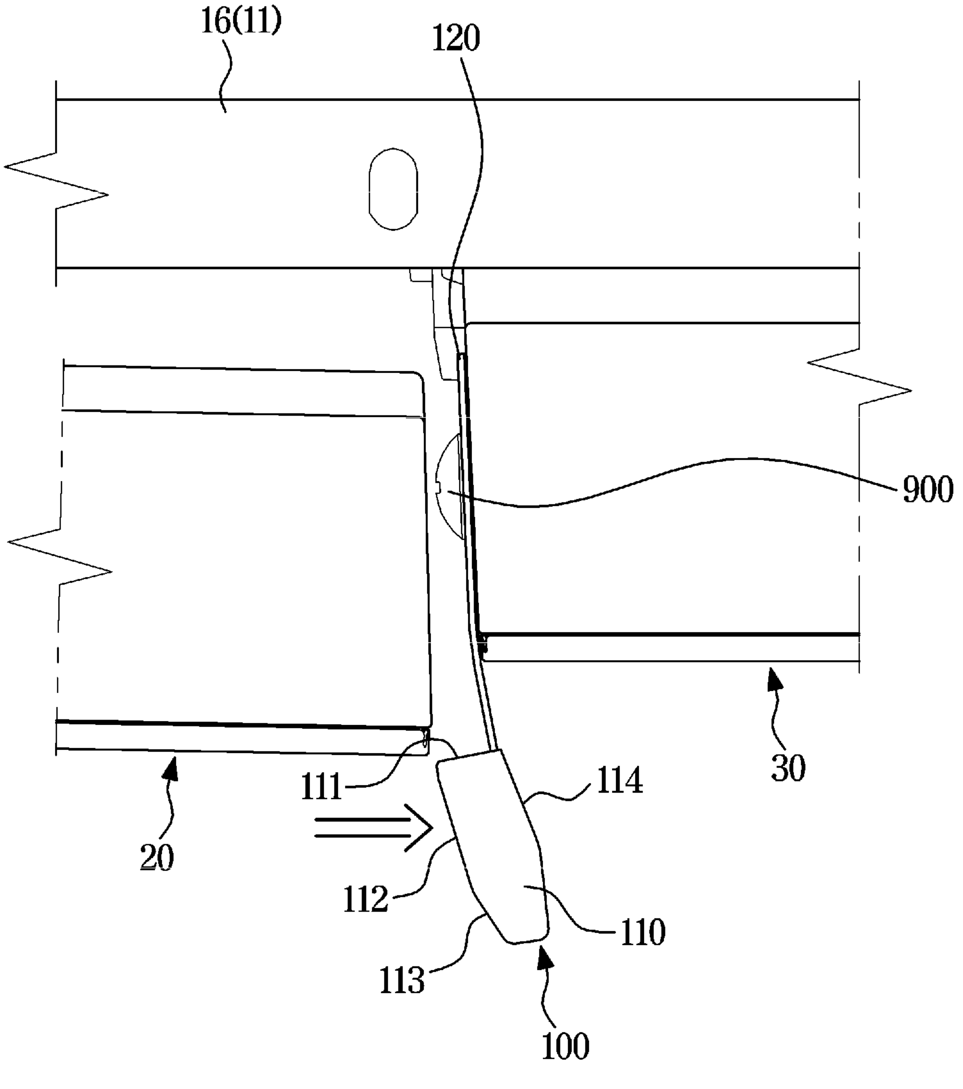
FIG. 15 is an enlarged view showing a state in which an interfering portion of the door lock of the cooking apparatus shown in FIG. 14 is located at a second position.

FIG. 15 is an enlarged view showing a state in which the interfering portion 110 of the door lock 100 of the cooking apparatus 1 shown in FIG. 14 is located at the second position.

An interaction of the door 20 with the door lock 100 at the second position of the interfering portion 110 of the door lock 100 will be described with reference to FIG. 15, below.

The interference by the door lock 100 may be released to move the door 20 from the interference position to the open position.

Because the interfering portion 110 of the door lock 100 may contact the door 20 at the first position, the interfering portion 110 may need to move to a position at which the interfering portion 110 does not contact the door 20 to release the interference with the door 20.

Because the door 20 performs a rotational motion, the interfering portion 110 may move out of the rotational radius of the door 20. A position to which the interfering portion 110 has moved out of the rotational radius of the door 20 may be referred to as a second position.

The second position of the interfering portion 110 may be more spaced from the door 20 than the first position of the interfering portion 110.

That is, the second position of the interfering portion 110 may be a position at which the interfering portion 110 has more moved away from the door 20 than at the first position. In other words, the second position of the interfering portion 110 may be a position at which the interfering portion 110 has moved to be closer to the control panel 30 than at the first position.

At the second position of the interfering portion 110 of the door lock 100, the interfering portion 110 may not limit opening of the door 20, and accordingly, at the second position of the interfering portion 110, the support surface 111 of the interfering portion 110 may be located out of the rotational radius of the door 20.

According to a movement of the interfering portion 110 to the second position, the deformable portion 120 may be deformed to move the interfering portion 110 because the interfering portion 110 is connected with the deformable portion 120 and one side of the deformable portion 120 is coupled to the control panel 30.

Because the interfering portion 110 is capable of moving in a direction of moving away from the door 20, the deformable portion 120 may also move in the direction of moving away from the door 20.

Also, because the interfering portion 110 is capable of moving in a direction of approaching the control panel 30, the deformable portion 120 may also move in the direction of approaching the control panel 30.

However, because the deformable portion 120 is coupled to the locking surface 36 of the control panel 30 and extends along the locking surface 36 while in contact with the locking surface 36, a portion of the deformable portion 120, the portion in contact with the control panel 30, may have difficulties in moving.

Accordingly, a portion of the deformable portion 120, the portion not in contact with the control panel 30 and positioned ahead of the front surface of the control panel 30, may change in position. More specifically, the portion of the deformable portion 120, the portion positioned ahead of the front surface of the control panel 30, may move toward the front surface of the control panel 30.

In another aspect, the deformable portion 120 of the door lock 100 may be fixed at a point of in contact with a front end of the locking surface 36 of the control panel 30 and extend from the point. The portion of the deformable portion

120 of the door lock 100, the portion extending from the point and positioned ahead of the control panel 30, may perform a rotational motion with respect to the fixed point.

However, because the deformable portion 120 may be a rigid material, the moved deformable portion 120 may receive an elastic force for returning to an original position.

That is, at the second position of the interfering portion 110, the deformable portion 120 may apply an elastic force of moving the interfering portion 110 to the first position. More specifically, the deformable portion 120 may continue to apply an elastic force of moving the interfering portion 110 to the first position.

Accordingly, a movement of the interfering portion 110 to another position, other than the first position, may result from applying a force for moving the interfering portion 110 to the interfering portion 110. The second position of the interfering portion 110 may result from applying a force for moving the interfering portion 110 to the second position. Accordingly, locating the interfering portion 110 to the second position to open the door 20 may be applying a force to the interfering portion 110. Also, because the interfering portion 110 may need to be located at the second position while the door 20 opens by moving from the interference position to the open position, the interfering portion 110 may need to receive a force capable of restraining an elastic force for returning to the first position while the door 20 opens by moving from the interference position to the open position.

Figure 16:
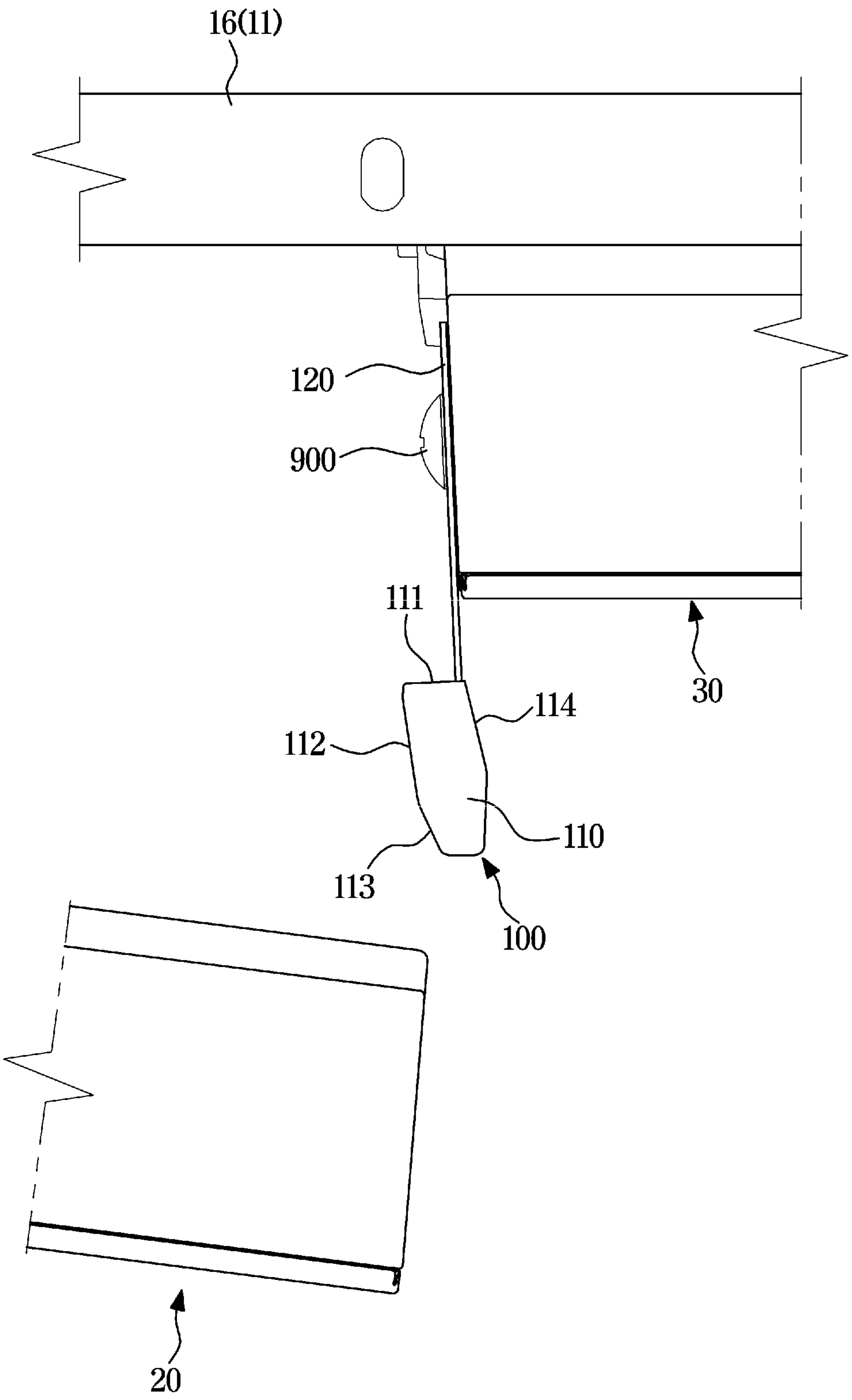
FIG. 16 is an enlarged view showing a state in which the door of the cooking apparatus shown in FIG. 15 is located at an open position.
Figure 17:
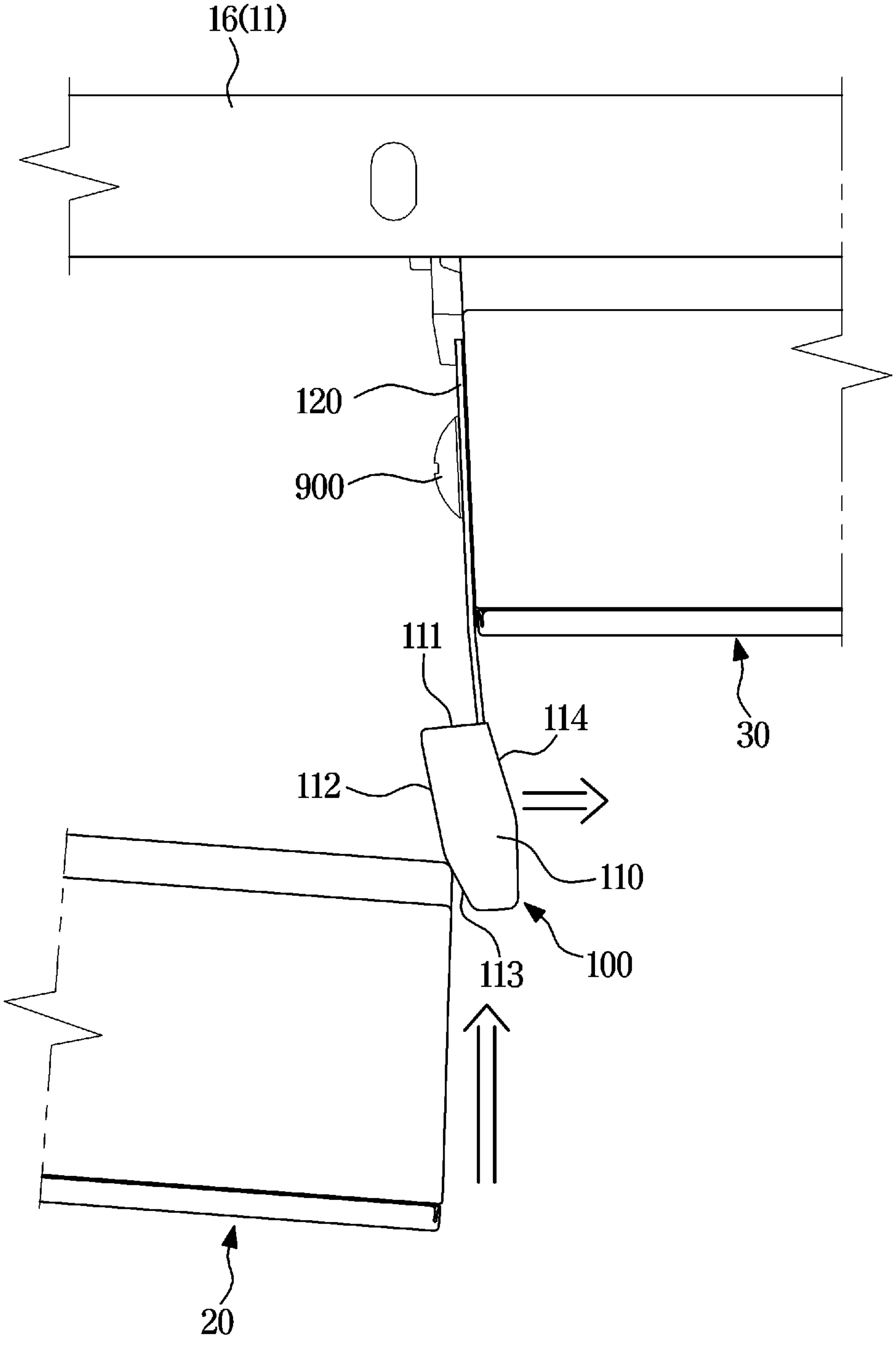
FIG. 17 is an enlarged view showing a state in which the door of the cooking apparatus shown in FIG. 15 moves from an open position to a closed position.

FIG. 16 is an enlarged view showing a state in which the door 20 of the cooking apparatus 1 shown in FIG. 15 is located at the open position. FIG. 17 is an enlarged view showing a state in which the door 20 of the cooking apparatus 1 shown in FIG. 15 moves from the open position to the closed position.

Interactions of the door 20 with the door lock 100 in a case in which the door 20 is at the open position and a case in which the door 20 moves to the closed position will be described with reference to FIGS. 16 and 17, below.

In the case in which the interfering portion 110 of the door lock 100 is at the second position, the door 20 may completely open.

After the door 20 moves to the open position, the interfering portion 110 may need not to be located at the second position. Accordingly, a user may no longer apply a force applied to move the interfering portion 110 to the second position.

In this case, because the interfering portion 110 receives an elastic force for moving to the first position, the interfering portion 110 may return to the first position.

Also, the door 20 may be at the open position at which the cooking room 41 is completely open. Accordingly, a user may take out a cooking material located inside the cooking room 41.

As described above, opening of the door 20 may be interfered by a movement of the door lock 100. To open the door 20, a user may press the button 33 to move the door 20 to the interference position. An operation for opening the door 20 may be referred to as a first operation.

In the case in which the door 20 is located at the interference position, the door lock 100 may be in contact with the door 20 to prevent the door 20 from opening out of the interference position. In this case, to release the contact of the door lock 100 to the door 20, a second operation for moving the door lock 100 may be performed.

By the operation, the door 20 may move to the open position at which the door 20 is more open than at the interference position. To sum up, the first operation and/or the second operation may need to be performed to move the door 20 from the closed position to the open position. Thereby, the user may be prevented from injury caused by hot heat discharged from a cooking material located inside the cooking room 41.

Upon a movement of the door 20 from the open position to the closed position, the door 20 may move while pressing the operation surface 113 formed in the interfering portion 110 of the door lock 100. Because the operation surface 113 is inclined to be closer to the door 20 at a front area, the movement of the door 20 may be not interfered by the interfering portion 110 while the door 20 starts moving to the interfering portion 110 toward the closed position. Upon a contact of the door 20 to the interfering portion 110, the door 20 may return to the closed position while pressing the operation surface 113, and accordingly, the movement of the door 20 may be not limited by the interfering portion 110.

So far, an embodiment of the disclosure has been described. Hereafter, another embodiment of the disclosure will be described. In the following embodiment of the disclosure, the same components as those shown in FIGS. 1 to 17 will be assigned the same reference numerals, and descriptions thereof will be omitted.

Figure 18:
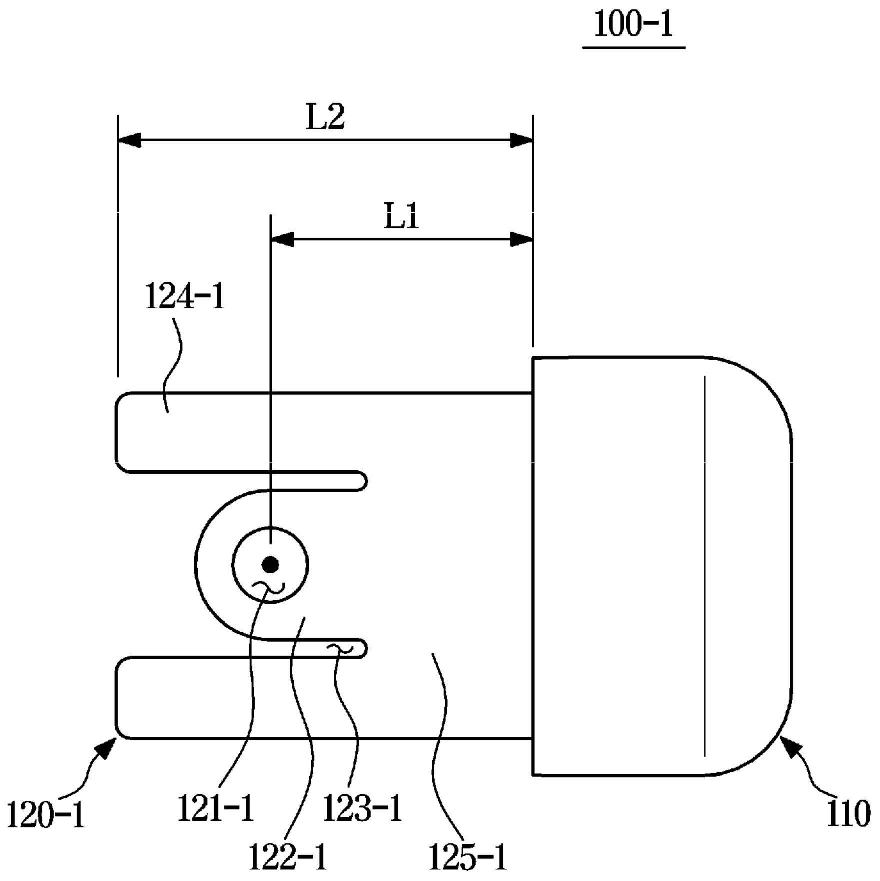
FIG. 18 is a side view showing a door lock of a cooking apparatus according to an embodiment of the disclosure.

FIG. 18 is a side view showing a door lock 100-1 of the cooking apparatus 1 according to an embodiment of the disclosure.

The door lock 100-1 according to an embodiment of the disclosure will be described with reference to FIG. 18.

A deformable portion 120-1 having a long length may be of great help in moving the door lock 100-1 from the first position to the second position because the deformable portion 120-1 moves significantly even with a small force. However, the deformable portion 120-1 having the long length may have a negative effect on the appearance of the cooking apparatus 1 because a major portion of the deformable portion 120-1 protrudes to outside of the cooking apparatus 1.

Accordingly, the deformable portion 120-1 may be a component having a length that is shorter than a preset length and capable of moving by a small force.

The deformable portion 120-1 included in the door lock 100-1 may include a coupling hole 121-1 with which a coupling member 900 is coupled.

Because the deformable portion 120 shown in FIG. 10 is coupled with the coupling member 900 at a point of the coupling hole 121 and is limited in moving at the corresponding point, a distance from the point of the coupling hole 121 to a point to which a force is applied may be a distance used to calculate a torque applied to the deformable portion 120.

Because the deformable portion 120 in which the coupling hole 121 is formed is fixed by the coupling member 900 at a point at which the coupling hole 121 is formed, a degree of a force required to move the door lock 100 may depend on a distance from a point receiving a force by the control panel 30 according to a user's force applied to the point at which the coupling hole 121 is formed.

However, the deformable portion 120-1 according to the current embodiment of the disclosure may include a slit 123-1 around the coupling hole 121.

The slit 123-1 may surround a coupling portion 122-1. In this case, pressure applied to the coupling portion 122-1 may be not transferred to the slit 123-1. Accordingly, an effect of tension applied to the coupling portion 122-1 may be less transferred to the interfering portion 110.

The deformable portion 120-1 of the door lock 100-1 may include the coupling portion 122-1 in which the coupling hole 121 is formed. A connecting portion 125-1 for connecting the coupling portion 122-1 with the interfering portion 110 of the door lock 100-1 may be formed.

The connecting portion 125-1 may be connected with the interfering portion 110.

The coupling portion 122-1 may extend from the connecting portion 125-1 in a direction away from the interfering portion 110. The coupling portion 122-1 may include the coupling hole 121-1 which the coupling member 900 penetrates.

The connecting portion 125-1 of the deformable portion 120-1 may have a width that is greater than a width of the coupling portion 122-1. Accordingly, the coupling portion 122-1 may be connected with a part of one end of the connecting portion 125-1.

The deformable portion 120-1 may include an extension portion 124-1 extending from the remaining part of the end of the connecting portion 125-1, where the remaining part may not be connected with the coupling portion 122-1, in a direction away from the interfering portion 110 of the door lock 100.

The coupling portion 122-1 may be coupled to a center of the end of the connecting portion 125-1. In this case, a pair of extension portions 124-1 may be positioned to both sides of the coupling portion 122-1 and coupled to the remaining part of the end of the connecting portion 125-1, the remaining part not connected with the coupling portion 122-1.

The slit 123-1 may surround a part of the coupling portion 122-1, where the part is opposite to another part of the coupling portion 122-1 extending toward the connecting portion 125-1. The slit 123-1 may be positioned between the coupling portion 122-1 and the extension portion 124-1. Accordingly, the coupling portion 122-1 may be spaced from the extension portion 124-1.

In this case, although the coupling member 900 is coupled to the door lock 100-1 to correspond to the coupling portion 122-1, a center of rotation of the door lock 100-1 may be a location corresponding to the extension portion 124-1 of which a movement is limited while in contact with the control panel 30, as well as the coupling portion 122-1. Accordingly, a torque calculated from the center of rotation may be obtained by summing a torque at the coupling portion 122-1 and a torque by the extension portion 124-1 of which the movement is limited. Accordingly, the door lock 100-1 may more easily move than the door lock 100 in which no slit 123-1 is formed.

Accordingly, because the coupling portion 122-1 is separated from the surrounding component by the slit 123-1, a distance between a point at which a force is applied and a fixed point may increase. Thereby, a desired magnitude of torque may be generated with a small force, which enables the door lock 100-1 to easily move.

In the current embodiment of the disclosure, the door lock 100-1 may be replaced with a model that rotates with respect to a fixed point. In this case, the door lock 100-1 may be replaced with a model in which a fixed point is formed between the point at which the coupling hole 121-1 is formed and a point at which an end of the extension portion 124-1 is formed.

A length L2 from the extension portion 124-1 to the interfering portion 110 may be longer than a length L2 from a center of the coupling hole 121- to the interfering portion 110.

According to a movement of the interfering portion 110 from the first position to the second position, the extension portion 124-1 may move in an opposite direction of a movement direction of the interfering portion 110.

Figure 19:
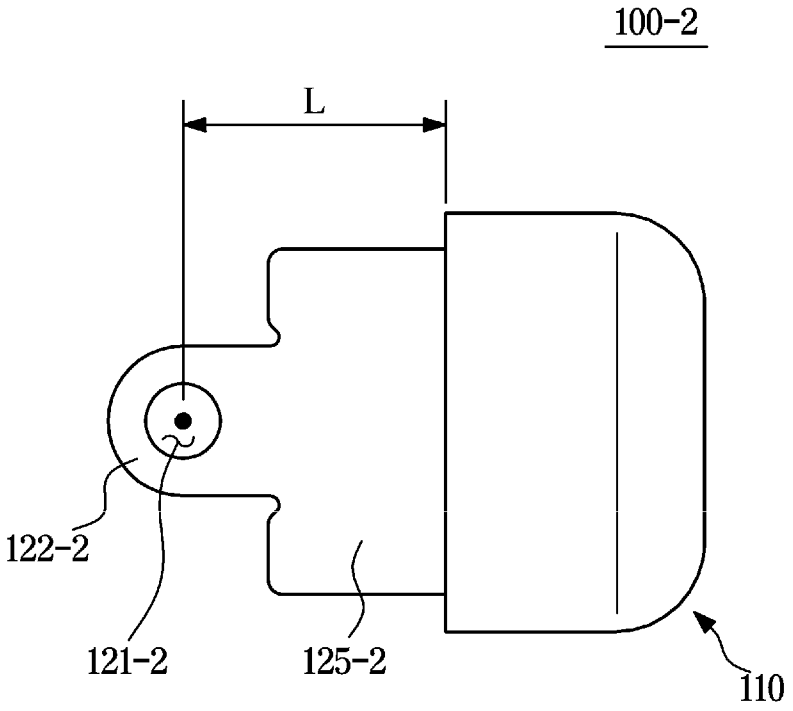
FIG. 19 is a side view showing a door lock of a cooking apparatus according to an embodiment of the disclosure.

FIG. 19 is a side view showing a door lock 100-2 of the cooking apparatus 1 according to an embodiment of the disclosure.

The door lock 100-2 according to an embodiment of the disclosure will be described with reference to FIG. 19.

The door lock 100-2 shown in FIG. 19 may be formed by removing the extension portion 124-1 from the door lock 100-1 shown in FIG. 18. Accordingly, descriptions given above with reference to FIG. 18 may also be applied in the same way to the current embodiment of the disclosure, except for descriptions about the extension portion 124-1 and the slit 123-1 provided between the extension portion 124-1 and the coupling portion 122-1.

In the current embodiment of the disclosure, a connecting portion 125-2 may be connected only with a coupling portion 122-2. Accordingly, upon a rotation of the door lock 100-2, the coupling portion 122-2 may be a center of rotation.

However, in a case in which a width of the coupling portion 122-2 is smaller than a width of the connecting portion 125-2, tension by the coupling portion 122-2 may be smaller than tension by the coupling portion 122-1 according to an embodiment of the disclosure as shown in FIG. 18. Accordingly, the door lock 100-2 may move with a smaller force.

A length L from a center of the coupling hole 121-2 to the interfering portion 110 may be substantially equal to the length L1 from the center of the coupling hole 121-1 shown in FIG. 18 to the interfering portion 110.

Figure 20:
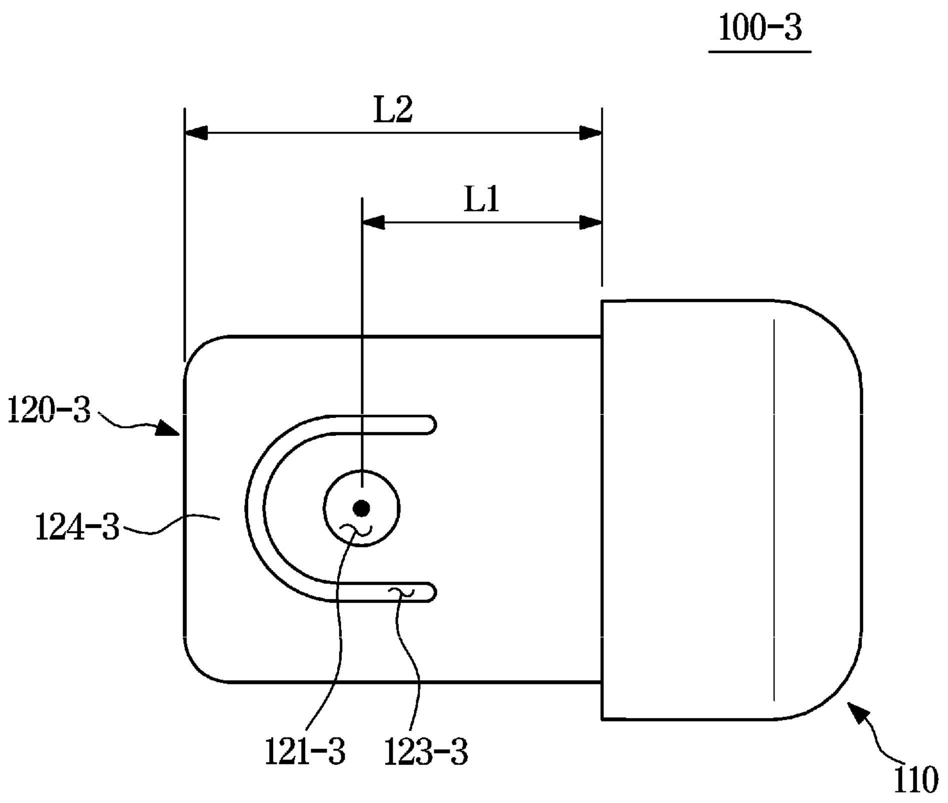
FIG. 20 is a side view showing a door lock of a cooking apparatus according to an embodiment of the disclosure.

FIG. 20 is a side view showing a door lock 100-3 of the cooking apparatus 1 according to an embodiment of the disclosure.

The door lock 100-3 according to an embodiment of the disclosure will be described with reference to FIG. 20.

The door lock 100-3 shown in FIG. 20 may have a shape resulting from connecting both ends of the pair of extension portions 124-1 of the door lock 100-1 shown FIG. 18. Accordingly, descriptions about the slit 123-1, given above with reference to FIG. 18, may also be applied in the same way to the current embodiment of the disclosure.

As shown in FIG. 18, in the case in which a pair of extension portions 124-1 is provided, the respective extension portions 124-1 may be located at coupling positions of the control panel 30. However, as shown in FIG. 20, in the case in which a single extension portion 124-3 is formed, it may be easy to locate the extension portion 124-3 at a desired coupling position.

Upon management of a plurality of door locks 100-1 each shown in FIG. 18, it may be difficult to manage each of the plurality of door locks 100-1 because a pair of extension portions 124-1 is provided and a deformable portion 120-1 of a door lock 100-1 may be inserted in a slit 123-1 formed between a coupling portion 122-1 and an extension portion 124-1 provided in another door lock 100-1. In the case in which a single extension portion 124-3 is formed, as shown in FIG. 20, it may be easy to manage a plurality of door locks 100-3 because a deformable portion 120-3 of any one door lock 100-3 is incapable of insertion in a slit 123-3 of another door lock 100-3.

A length L2 from the extension portion 124-3 to the interfering portion 110 may be longer than a length L1 from a center of a coupling hole 121-3 to the interfering portion 110.

Also, a length L2 from an end of the deformable portion 120-3 to the interfering portion 110-3 may be longer than the length L2 from the center of the coupling hole 121-3 to the interfering portion 110-3.

Components or portions not specifically described will be understood by referring to the above descriptions about the door lock 100-3 shown in FIG. 16 unless clearly indicated otherwise in a related context.

Figure 21:
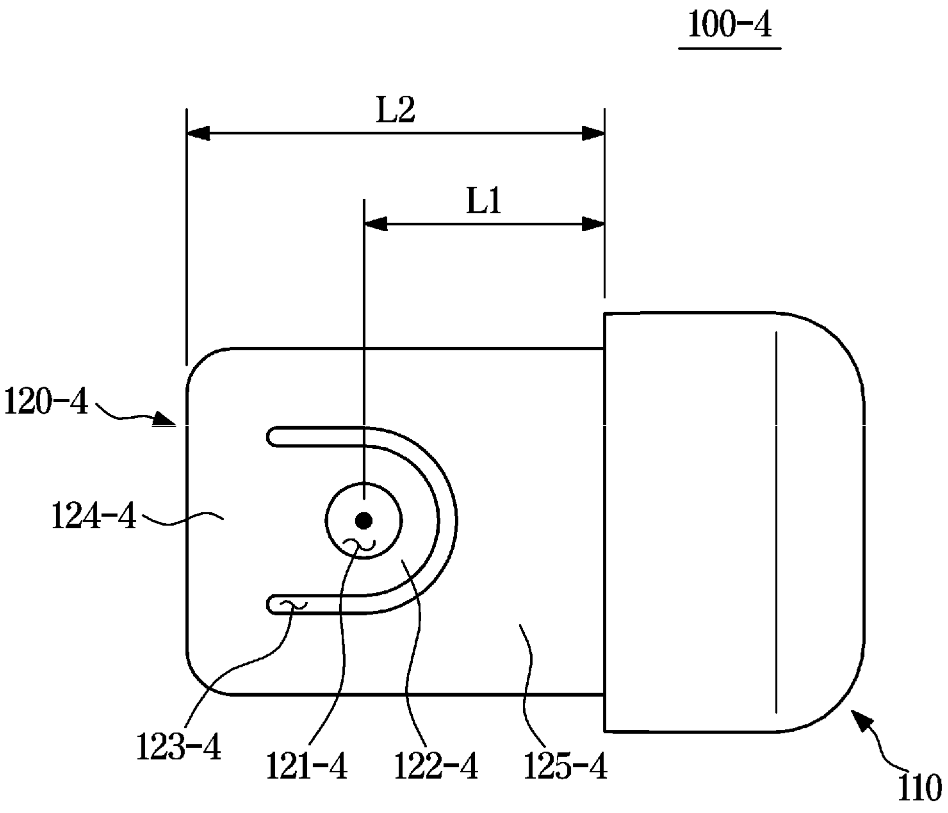
FIG. 21 is a side view showing a door lock of a cooking apparatus according to an embodiment of the disclosure.

FIG. 21 is a side view showing a door lock 100-4 of the cooking apparatus 1 according to an embodiment of the disclosure.

The door lock 100-4 according to an embodiment of the disclosure will be described with reference to FIG. 21.

FIG. 21 shows a shape resulting from left-right reversing a shape of the slit 123-3 formed in the deformable portion 120-3 shown in FIG. 20.

A deformable portion 120-4 may include a connecting portion 125-4 protruding from the interfering portion 110-4, and an extension portion 124-4 including a pair of extension parts may be formed at upper and lower parts of the connecting portion 125-4. The extension portion 124-4 may include a part connecting the pair of extension parts with each other. A coupling portion 122-4 in which a coupling hole 121-4 is formed may be positioned between the pair of extension parts of the extension portion 124-4. A slit 123-4 for spacing at least one area of the coupling portion 122-4 from the extension portion 124-4 may be formed between the extension portion 124-4 and the coupling portion 122-4.

The slit 123-4 may have substantially a semicircle shape of which both ends are rear ends of the pair of extension parts of the extension portion 124-4.

In this case, although a coupling member 900 is coupled to the door lock 100-4 to correspond to the coupling portion 122-4, a center of rotation of the door lock 100-4 may be not the coupling portion 122-4. The reason may be because the door lock 100-4 may be not bent with respect to the coupling portion 122-4 due to the slit 123-4 provided in front of the coupling portion 122-4.

A substantial center of rotation of the door lock 100-4 may be a point between the coupling portion 122-4 and an end of the extension portion 124-4 positioned behind the coupling portion 122-4.

Figure 22:
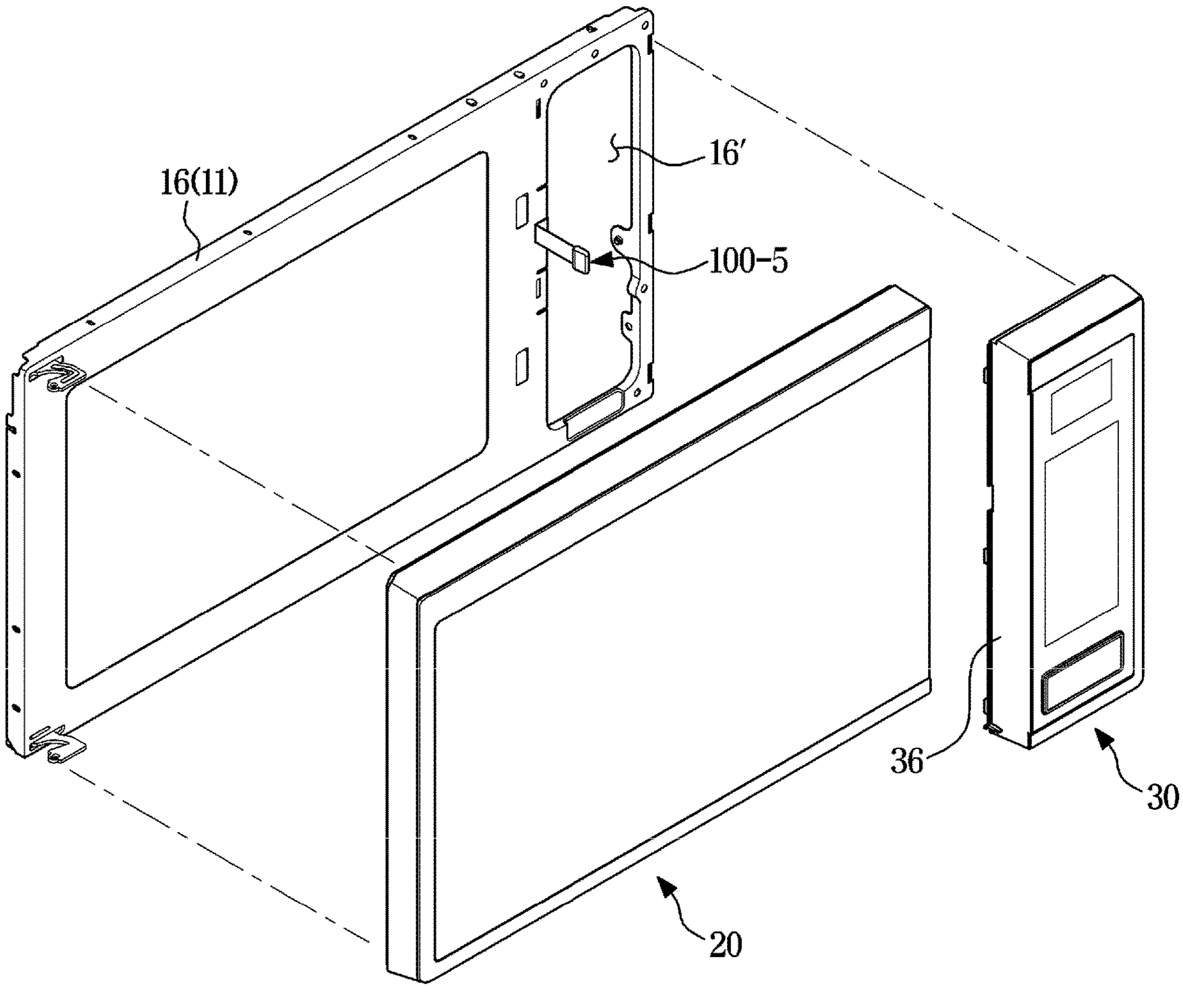
FIG. 22 is an exploded view showing a state in which a door lock of a cooking apparatus according to an embodiment of the disclosure is coupled to a front panel.
Figure 23:
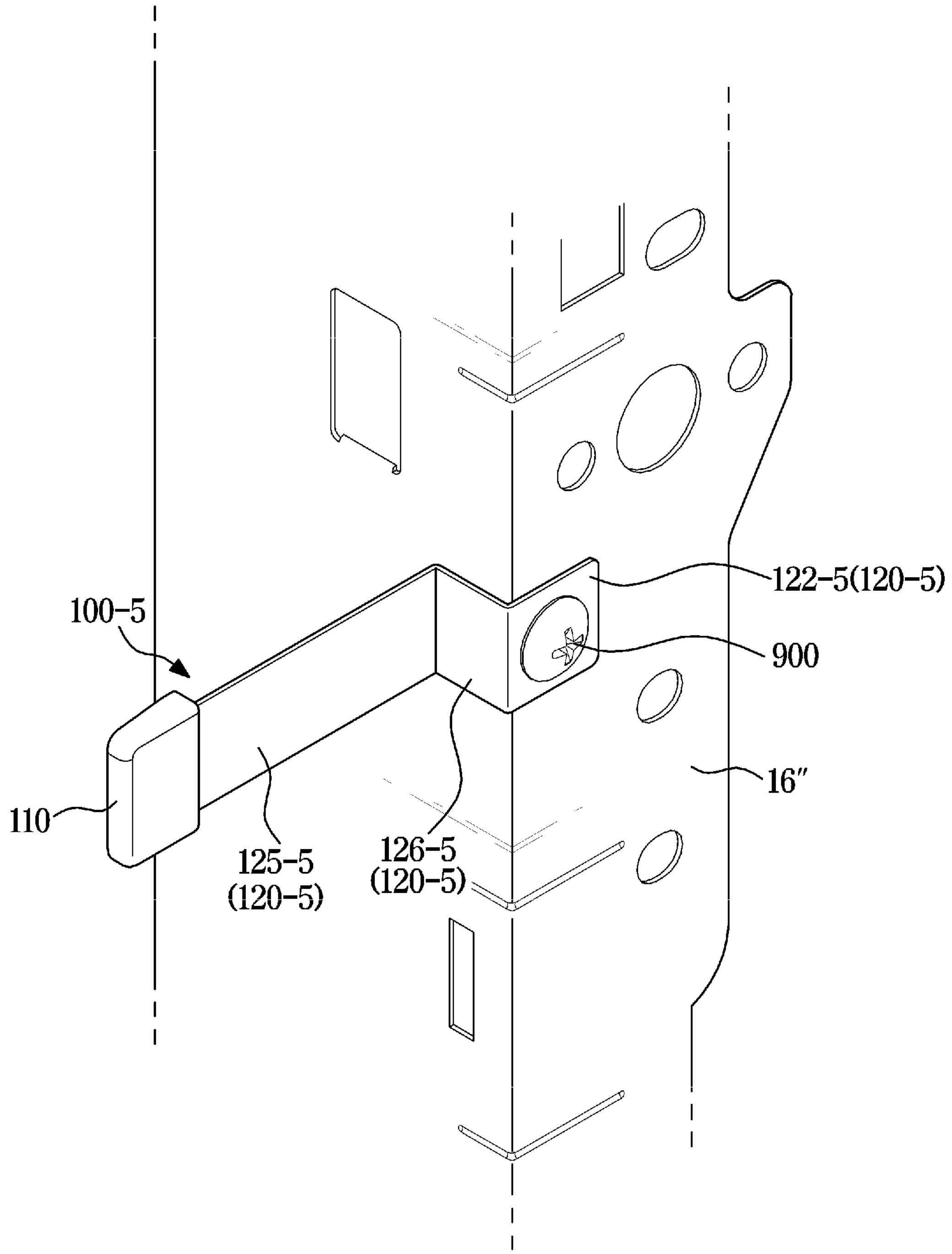
FIG. 23 is a rear perspective view showing a state in which the door lock of the cooking apparatus shown in FIG. 22 is coupled to the front panel, as seen from behind.

FIG. 22 is an exploded view showing a state in which a door lock 100-5 of the cooking apparatus 1 according to an embodiment of the disclosure is coupled to the front panel 16. FIG. 23 is a rear perspective view showing a state in which the door lock 100-5 of the cooking apparatus 1 shown in FIG. 22 is coupled to the front panel 16, as seen from behind.

The door lock 100-5 according to an embodiment of the disclosure and components adjacent to the door lock 100-5 will be described with reference to FIGS. 22 and 23.

A deformable portion 120-5 may be coupled to the outer case 11. The outer case 11 may include a metal material, and the control panel 30 may include a plastic material. Accordingly, coupling the deformable portion 120-5 to the outer case 11, instead of the control panel 30, may secure stable coupling of the deformable portion 120-5.

Because the deformable portion 120-5 may have a shape extending toward the front direction, the deformable portion 120-5 may be coupled to the front panel 16 to manufacture the deformable portion 120-5 with a smaller amount of material.

The front panel 16 may include the control opening 16' opening in the front-rear direction in a location where the control panel 30 is coupled to the front panel 16.

The front panel 16 may include an opening flange 16" bent and extending toward the rear direction in at least one portion of the control opening 16'.

The deformable portion 120-5 may be coupled to a portion of the opening flange 16", the portion adjacent to the door 20. In this case, the deformable portion 120-5 may include a coupling portion 122-5 coupled to the opening flange 16".

The deformable portion 120-5 may include a bent portion 126-6 extending from the coupling portion 122-5 toward the front direction, bent along the front surface of the front panel 16, and extending toward the door 20.

The deformable portion 120-5 may include a connecting portion 125-5 extending from the bent portion 126-5 toward the front direction.

The connecting portion 125-5 may extend in the front direction along the locking surface 36 of the control panel 30.

After the coupling portion 122-5 is coupled to the opening flange 16" by a coupling member 900, the coupling member 900 may be not seen from the exterior of the cooking apparatus 1, resulting in an improvement of an aesthetic impression of the cooking apparatus 1.

In other words, the deformable portion 120-5 may be mounted on the outer case 11.

Figure 24:
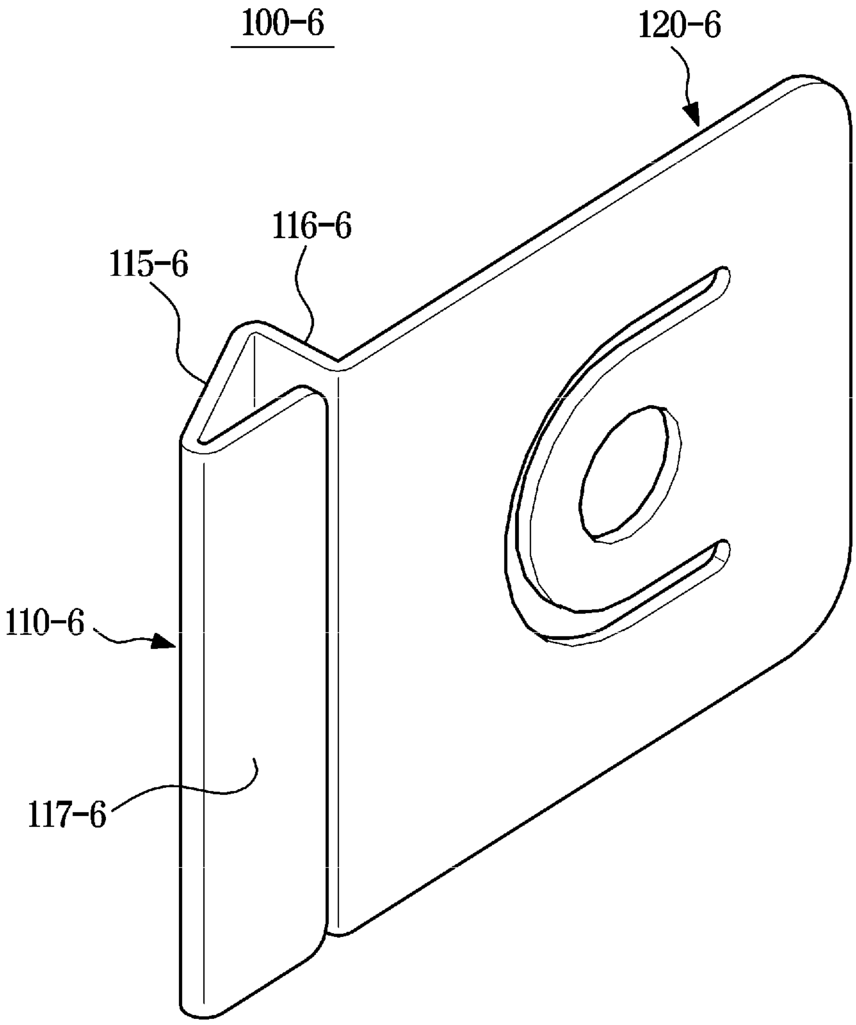
FIG. 24 is a perspective view showing a door lock of a cooking apparatus according to an embodiment of the disclosure.

FIG. 24 is a perspective view showing a door lock 100-6 of the cooking apparatus 1 according to an embodiment of the disclosure.

The door lock 100-6 according to an embodiment of the disclosure will be described with reference to FIG. 24.

As shown in FIG. 24, the door lock 100-6 may be formed as one body.

The door lock 100-6 may include an interfering portion 110-6 integrated into a deformable portion 120-6.

The interfering portion 110-6 may include a step portion 116-6 bent from one end of the deformable portion 120-6 and extending toward one direction. The step portion 116-6 may be substantially perpendicular to the deformable portion 120-6.

The interfering portion 110-6 may include an inclined portion 115-6 bent from one end of the step portion 116-6 and extending while inclined toward the front direction.

The inclined portion 115-6 may move in a direction away from the door 20 according to a movement of the door 20 from the open position to the closed position to guide the door 20 without interfering with the movement of the door 20.

The interfering portion 110-6 may include a cover portion 117-6 bent and extending from an end of the inclined portion 115-6 toward the rear direction to prevent injury of a user gripping the inclined portion 115-6. The user may be prevented from injury by gripping a bent portion connecting the inclined portion 115-6 with the cover portion 117-6.

In addition, the door lock 100-6 may be manufactured by processing, such as folding a plate or forming a hole in a plate.

Figure 25:
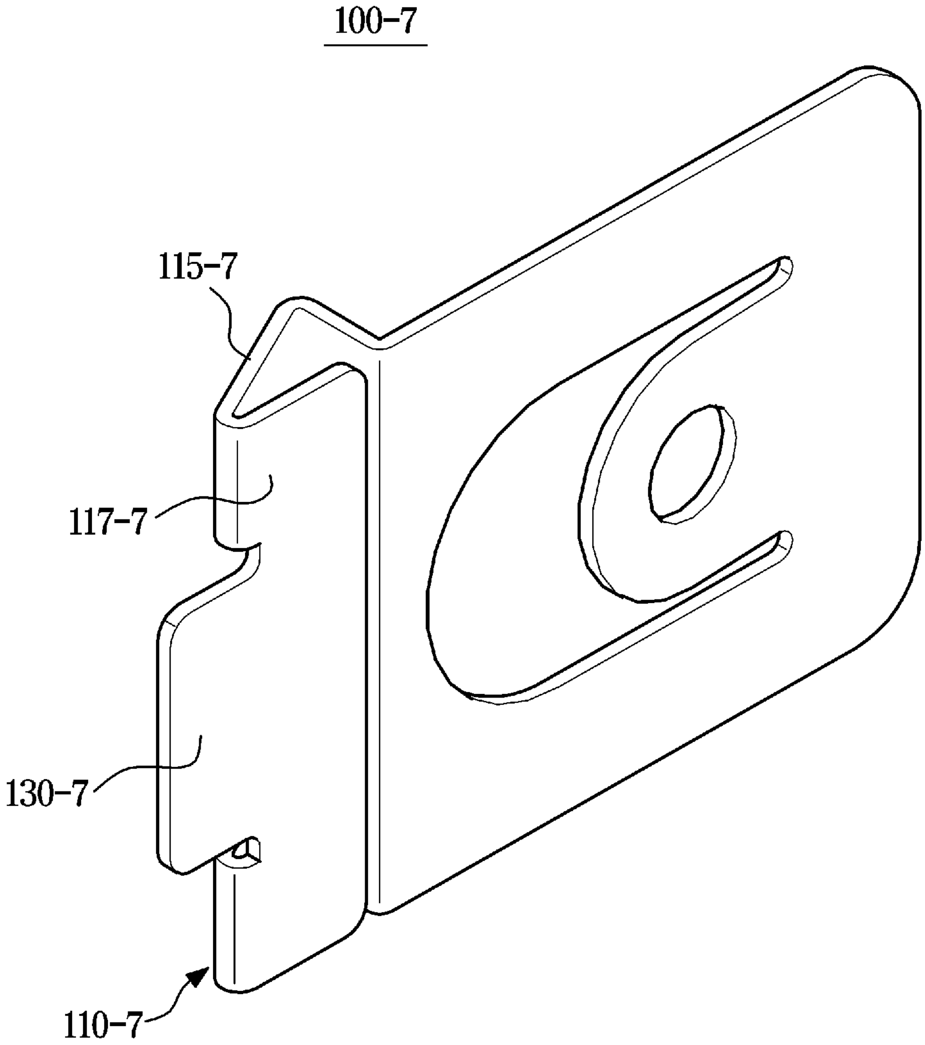
FIG. 25 is a perspective view showing a door lock of a cooking apparatus according to an embodiment of the disclosure.

FIG. 25 is a perspective view showing a door lock 100-7 of the cooking apparatus 1 according to an embodiment of the disclosure.

The door lock 100-7 according to an embodiment of the disclosure will be described with reference to FIG. 25.

The door lock 100-7 shown in FIG. 25 may be formed by adding an operating portion 130-7 to the interfering portion 110-6 of the door lock 100-6 of FIG. 24.

The door lock 100-7 may include the operating portion 130-7 formed by extending a front end of a cover portion 117-7 of an interfering portion 110-7 toward the front direction. Accordingly, because the interfering portion 110-7 further extends toward the front direction, it may be easy to move the interfering portion 110-7 to a second position.

The operating portion 130-7 may have a shape resulting from cutting a part of the inclined portion 115-7 and then spreading the part of the inclined portion 115-7 toward the front direction.

Figure 26:
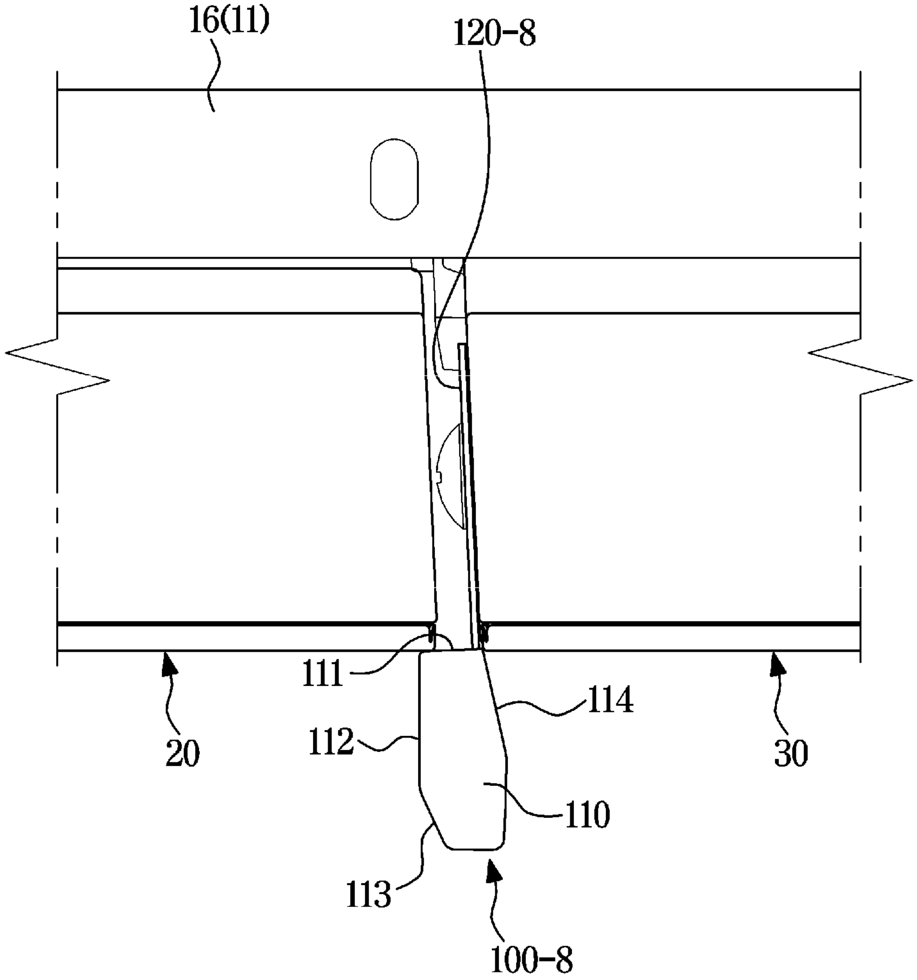
FIG. 26 is an enlarged view showing components around a door lock of a cooking apparatus according to an embodiment of the disclosure.

FIG. 26 is an enlarged view showing components around a door lock 100-8 of the cooking apparatus 1 according to an embodiment of the disclosure.

The door lock 100-8 according to an embodiment of the disclosure will be described with reference to FIG. 26.

A deformable portion 120-8 may extend such that the front surface of the door 20 is in contact with the support surface 111 of the interfering portion 110 at a closed position of the door 20.

In this case, a first operation for opening the door 20 may be an operation of pressing the button 33, and a second operation for opening the door 20 may be an operation of moving the door lock 100-8 to a second position while pressing the button 33. In a state in which the door lock 100 moves to the second position, the button 33 may be pressed to open the door 20.

To perform the first operation and the second operation, a user may need to open the cooking apparatus 1 with both hands.

Figure 27:
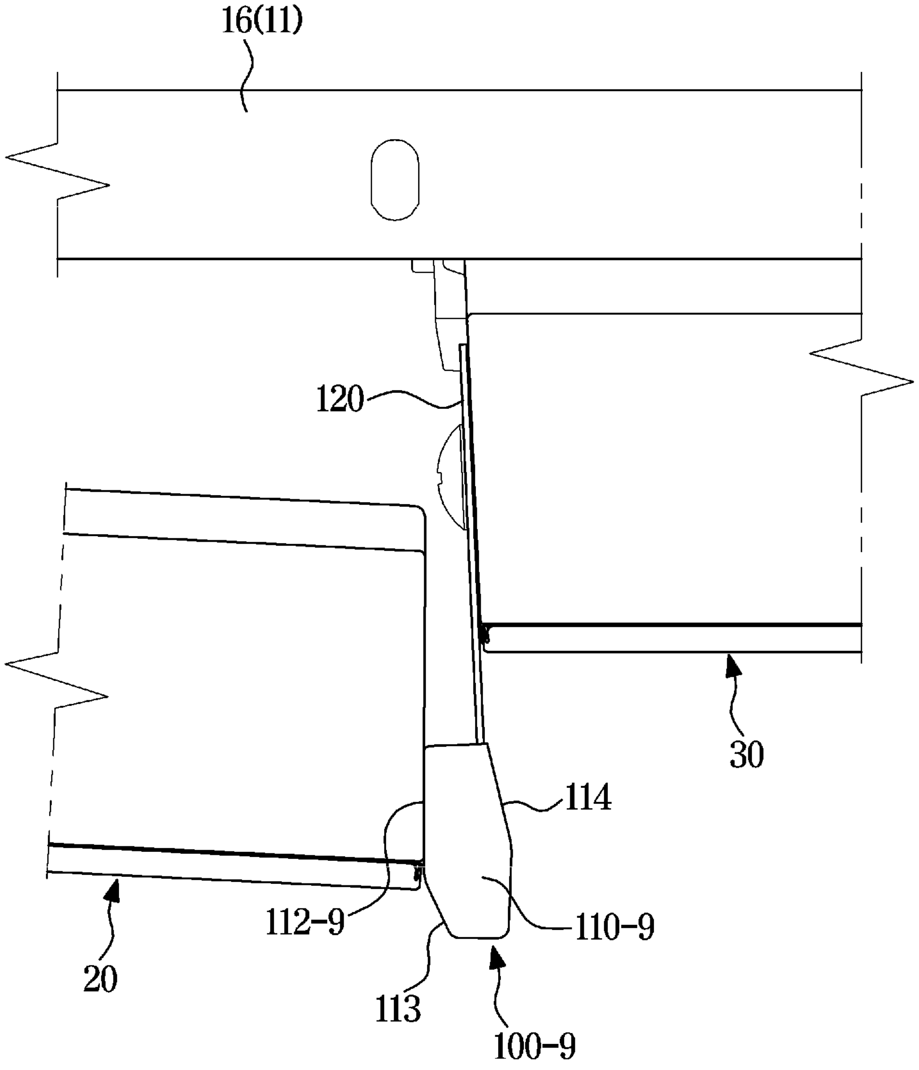
FIG. 27 is an enlarged view showing components around a door lock of a cooking apparatus according to an embodiment of the disclosure.

FIG. 27 is an enlarged view showing components around a door lock 100-9 of the cooking apparatus 1 according to an embodiment of the disclosure.

The door lock 100-9 according to an embodiment of the disclosure will be described with reference to FIG. 27.

The door 20 may be in contact with an extension surface 112-9 of the door lock 100-9.

In other words, an interference position of the door 20 may be a position of a contact to the extension surface 112-9 included in the interfering portion 110-9 of the door lock 100-9.

In this case, the extension surface 112-9 may need to be positioned on a radius of rotation of the door 20.

To release an interference with the door 20, the interfering portion 110-9 may need to move to a second position, as described above.

In other words, at the interference position of the door 20, opening of the door 20 may be limited by a friction force with the interfering portion 110.

In the case in which the door 20 is at the interference position, the door lock 100-9 may limit opening of the door 20 by a friction force with the door 20.

Figure 28:
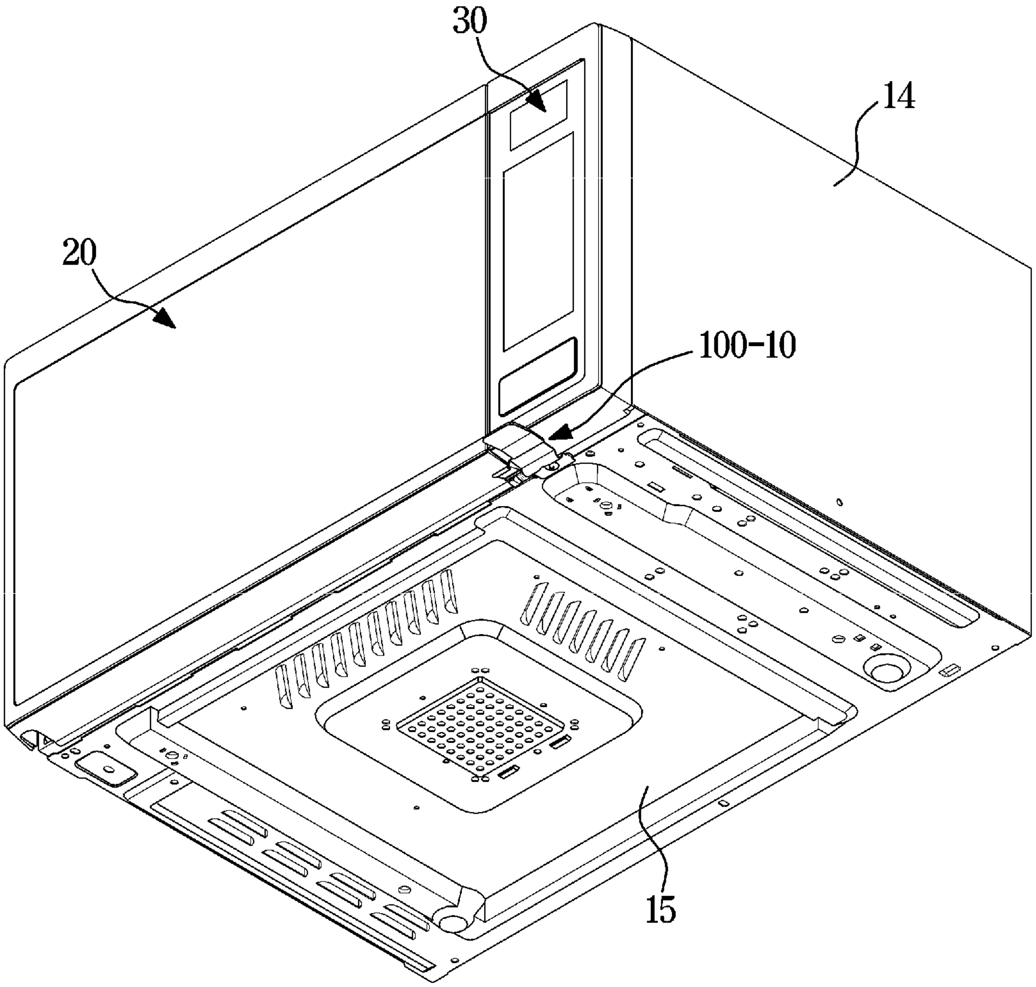
FIG. 28 is a bottom perspective view of a cooking apparatus according to an embodiment of the disclosure, as seen from below.
Figure 29:
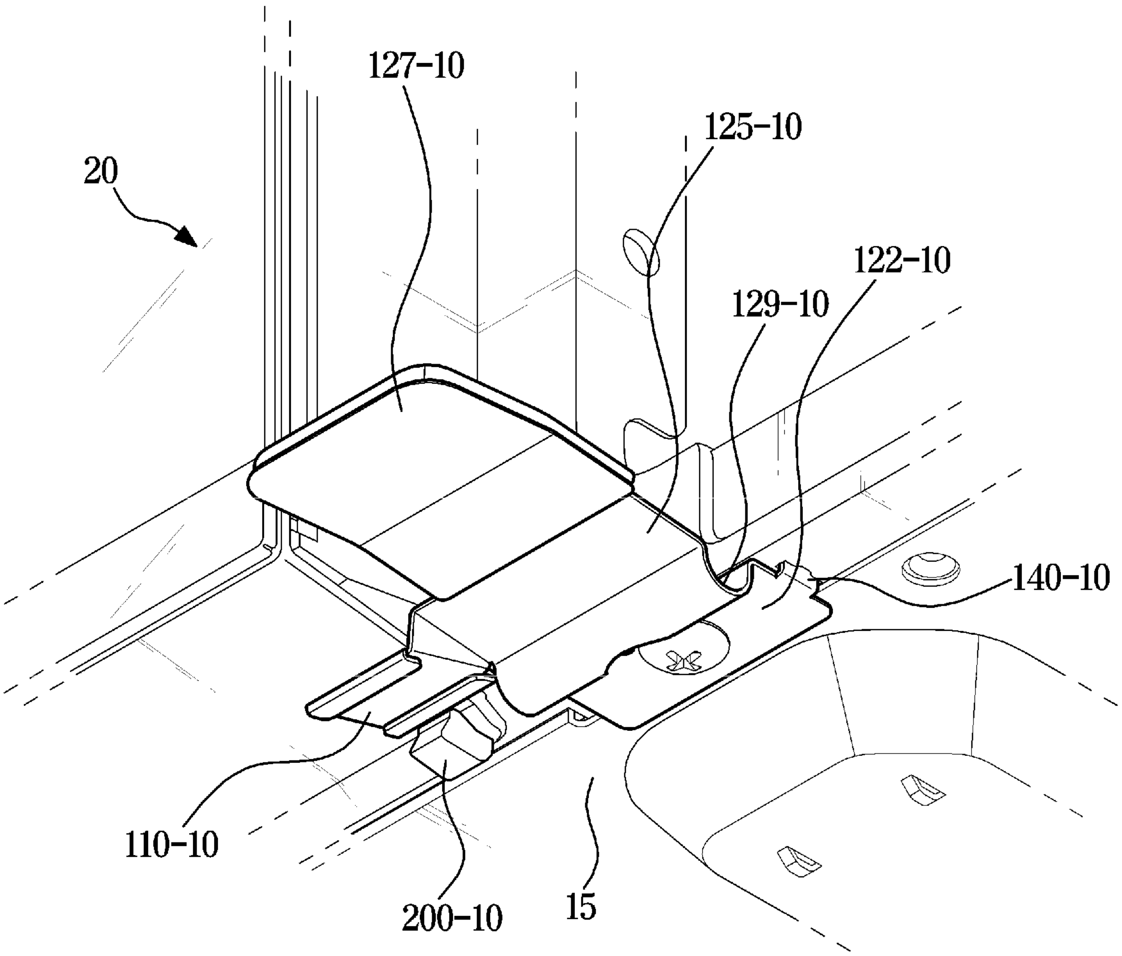
FIG. 29 is an enlarged view showing a door lock of the cooking apparatus shown in FIG. 28.

FIG. 28 is a bottom perspective view of the cooking apparatus 1 according to an embodiment of the disclosure, as seen from below. FIG. 29 is an enlarged view showing a door lock 100-10 of the cooking apparatus 1 shown in FIG. 28.

The door lock 100-9 according to an embodiment of the disclosure will be described with reference to FIGS. 28 and 29. In the following description about the embodiment of the disclosure as shown in FIGS. 28 and 29, the same components as those shown in FIGS. 1 to 17 will be assigned the same reference numerals, and descriptions thereof will be omitted.

The door lock 100-10 may be coupled to the bottom panel 15 of the outer case 11. More specifically, the door lock 100-10 may include a deformable portion coupled to the bottom panel 15. The deformable portion 120-10 may include a coupling portion 122-10 coupled to the bottom panel 15. In the bottom panel 15, an insertion hole may be formed to correspond to the coupling portion 122-10. The coupling portion 122-10 may be inserted in the insertion hole.

However, the door lock 100-10 may be coupled to a lower surface of the control panel 30, instead of the outer case 11. The door lock 100-10 may limit a movement of the door 20 by coupling to a component that does not move together with the door 20, which will be described below. The door lock 100 may be coupled to any component existing at any location capable of limiting a movement of the door 20.

The door lock 100-10 may be positioned below the door 20. The deformable portion 120-10 may be positioned below the door 20. More specifically, the deformable portion 120-10 may be provided immediately below the control panel 30. The reason may be to cause the interfering portion 110-10 to interfere with a catching protrusion 200-10 (will be described below) provided at a side end of the door 20. The catching protrusion 200-10 may be positioned at the side end of the door 20 such that the catching protrusion 200-10 has a farthest radius of movement upon a movement of the door 20 to properly control the movement of the door 20.

At one side of the coupling portion 122-10, an insertion portion 140-10 protruding toward the bottom panel 15 to be inserted in inside of the bottom panel 15 may be formed. The insertion portion 140-10 may be bent from one side of the coupling portion 122-10 and extend upward. Accordingly, because the insertion portion 140-10 is insertable into the bottom panel 15, the door lock 100 may be easily located at a desired position. Accordingly, a difficulty level of assembly may be lowered.

The interfering portion 110-10 of the door lock 100-10 may interfere with opening of the door 20 by contacting the front surface of the door 20. In the current embodiment of the disclosure, an interference of the door 20 by a contact of the door lock 100-10 to the catching protrusion 200-10 (will be described below) will be described below.

The door 20 may include the catching protrusion 200-10 protruding to interfere with the door lock 100-10.

The door 20 may include the catching protrusion 200-10 protruding downward from a lower surface. That is, the catching protrusion 200-10 may protrude from the bottom of the door 20. The interfering portion 110-10 may protrude from the deformable portion 120-10 to interfere with the catching protrusion 200-10. The interfering portion 110-10 may extend from the deformable portion 120-10 toward the catching protrusion 200-10.

The door lock 100-10 may include the interfering portion 110-10 that is located in front of the catching protrusion 200-10 at the closed position of the door 20.

The interfering portion 110-10 may extend from a side portion of the deformable portion 120-10 toward the door 20. Also, the interfering portion 110 may have a shape that has a first bend, extends downward, a second bend, and extends in a side direction to be aligned with the catching protrusion 200-10 in height to contact the catching protrusion 200-10 upon a movement in front direction of the catching protrusion 200-10.

The deformable portion 120-10 may include a control portion 127-10 formed at a front end and extending toward the front direction of the door 20. The deformable portion 120-10 may include the control portion 127-10 protruding from the main body 10 to be controllable to move the interfering portion 110-10.

Figure 30:
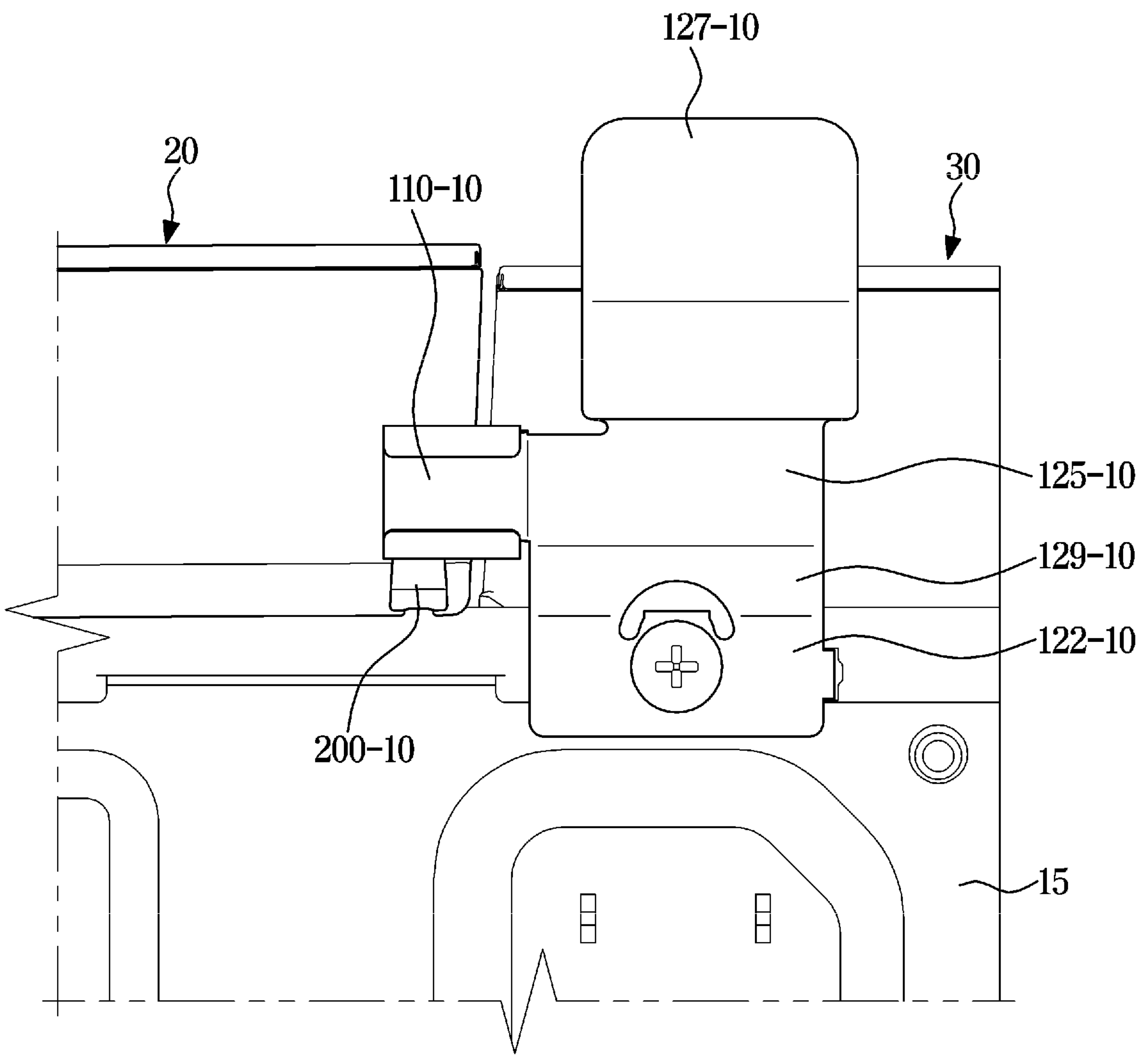
FIG. 30 is a bottom view showing a state in which a door of the cooking apparatus show in FIG. 29 is located at an interference position.

FIG. 30 is a bottom view showing a state in which the door 20 of the cooking apparatus 1 show in FIG. 29 is located at the interference position.

An interaction between the door 20 and the door lock 100-10 at the interference position of the door 20 will be described with reference to FIG. 30.

The catching protrusion 200-10 extending downward from the door 20 may move in the front direction together with the door 20 upon a movement of the door 20 from the closed position to the open position.

Because the interfering portion 110-10 is positioned in front of the catching protrusion 200-10, the catching protrusion 200-10 may contact the interfering portion 110-10 to stop moving. At this time, because the catching protrusion 200-10 is prevented from moving in the front direction, the door 20 may be prevented from moving in the front direction.

Figure 31:
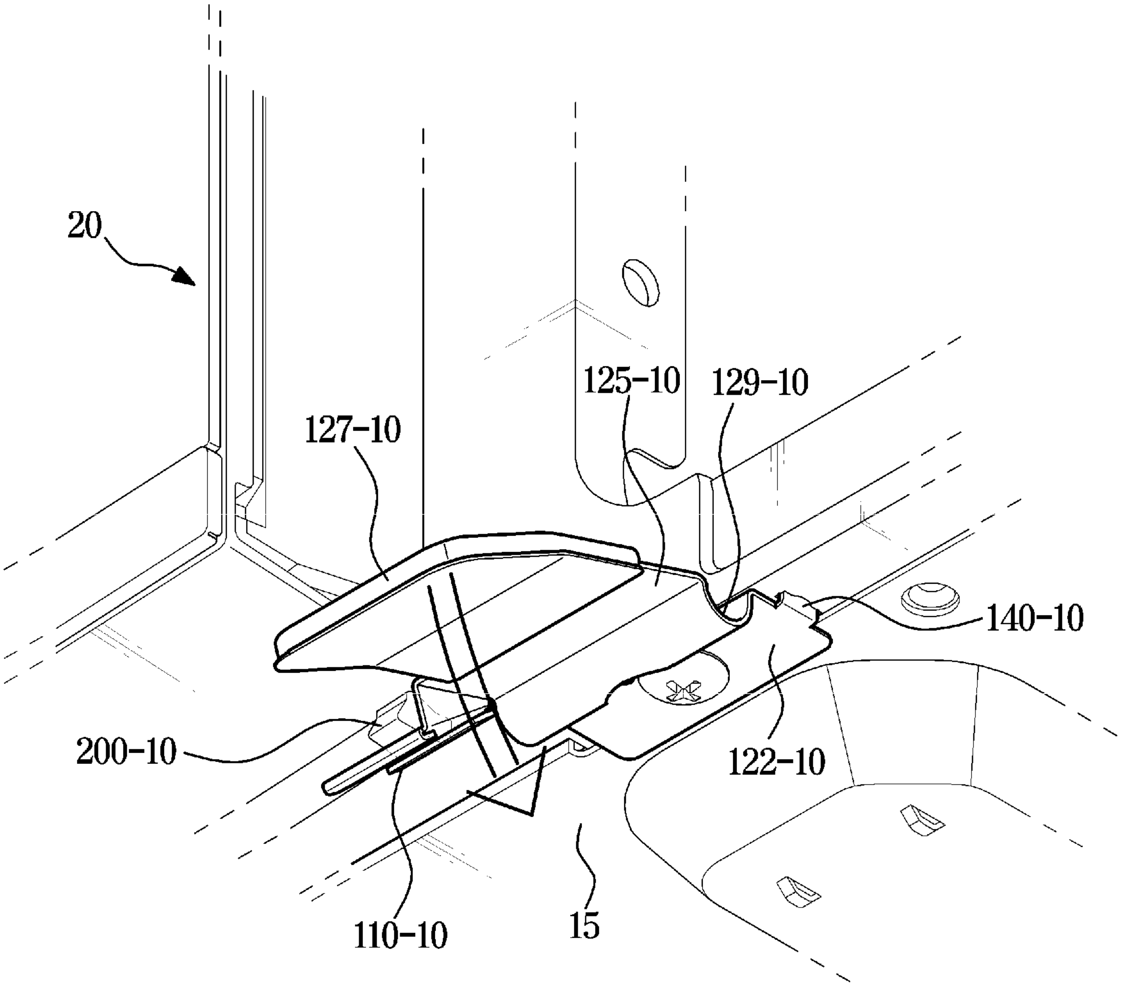
FIG. 31 is a bottom perspective view showing a state in which the door lock of the cooking apparatus shown in FIG. 30 is located at a second position.

FIG. 31 is a bottom perspective view showing a state in which the door lock 100-10 of the cooking apparatus 1 shown in FIG. 29 is located at the second position.

The second position of the door lock 100-10 will be described with reference to FIG. 31.

The interfering portion 110-10 of the door lock 100-10 may interfere with the catching protrusion 200-10, as described above. Accordingly, the door 20 may move to the interference position to be limited in opening.

To move the door 20 to the open position, the interference by the door lock 100-10 may be released. To release the interference by the door lock 100-10, a front portion of the door lock 100-10 may move downward. More specifically, by moving the control portion 127-10 of the door lock 100-10 downward, the door 20 may be allowed to move to the open position.

According to the downward movement of the control portion 127-10, the interfering portion 110-10 connected with the control portion 127-10 may move downward. According to the downward movement of the interfering portion 110-10, the interfering portion 110-10 may be not positioned in front of the catching protrusion 200-10. Accordingly, while the door 20 moves in the front direction toward the open position, the catching protrusion 200-10 may not contact the interfering portion 110-10.

That is, the deformable portion 120-10 may include the control portion 127-10 positioned below the door 20, formed in a front portion of the deformable portion 120-10 in such a way as to be spaced from the door 20, and bent and extending in a direction that is away from the door 20.

The position of the interfering portion 110-10 may be referred to as a first position. In other words, the first position of the interfering portion 110-10 may be a position at which the interfering portion 110-10 does not interfere with a movement of the door 20. That is, a movement of the interfering portion 110-10 to the first position may allow a movement of the door 20. The first position may be a position at which the interfering portion 110-10 allows a movement of the door 20.

The control portion 127-10 may be bent and extend in the direction that is away from the door 20 to enable a user to easily move the control portion 127-10 downward. More specifically, the control portion 127-10 may be bent and extend downward.

The user may apply a force to the control portion 127-10 to move the control portion 127-10 downward, while the door 20 moves from the interference position to the open position. In this case, because the deformable portion 120-10 is formed as a single body, the coupling portion 122-10 located at one end of the deformable portion 120-10 may be fixed, and the deformable portion 120-10 may be deformed by a movement of the control portion 127-10 located at the other end of the deformable portion 120-10.

Upon a movement of the control portion 127-10 positioned at the front portion of the deformable portion 120-10, the deformable portion 120-10 may be deformed because the coupling portion 122-10 positioned at a rear part of the deformable portion 120-10 may be coupled to the bottom panel 15 of the outer case 11.

As described above, the deformable portion 120-10 may include an elastic material. More specifically, the deformable portion 120-10 may include a metal material. Accordingly, after the deformable portion 120-10 is deformed, the deformable portion 120-10 may receive an elastic force to be restored to an original shape not deformed.

After the interfering portion 110-10 is deformed from the first position to the second position by deformation of the deformable portion 120-10, the deformable portion 120-10 may receive an elastic force such that the interfering portion 110-10 is restored from the second position to the first position.

After the interfering portion 110-10 moves from the second position to the first position, the door 20 may have difficulties in moving in the front direction by an interaction with the catching protrusion 200-10. Accordingly, a user may need to apply a force in an opposite direction of a direction in which the elastic force is applied to the deformable portion 120-10, while the door 20 moves to the open position, to prevent the interfering portion 110-10 from moving from the second position to the first position.

The user may press the control portion 127-10 downward while the door 20 moves from the interference position to the open position.

However, because the door 20 may receive a force for moving toward the front direction, the door 20 may move in the front direction according to a downward movement of the control portion 127-10 by the user to be located at the open position.

Figure 32:
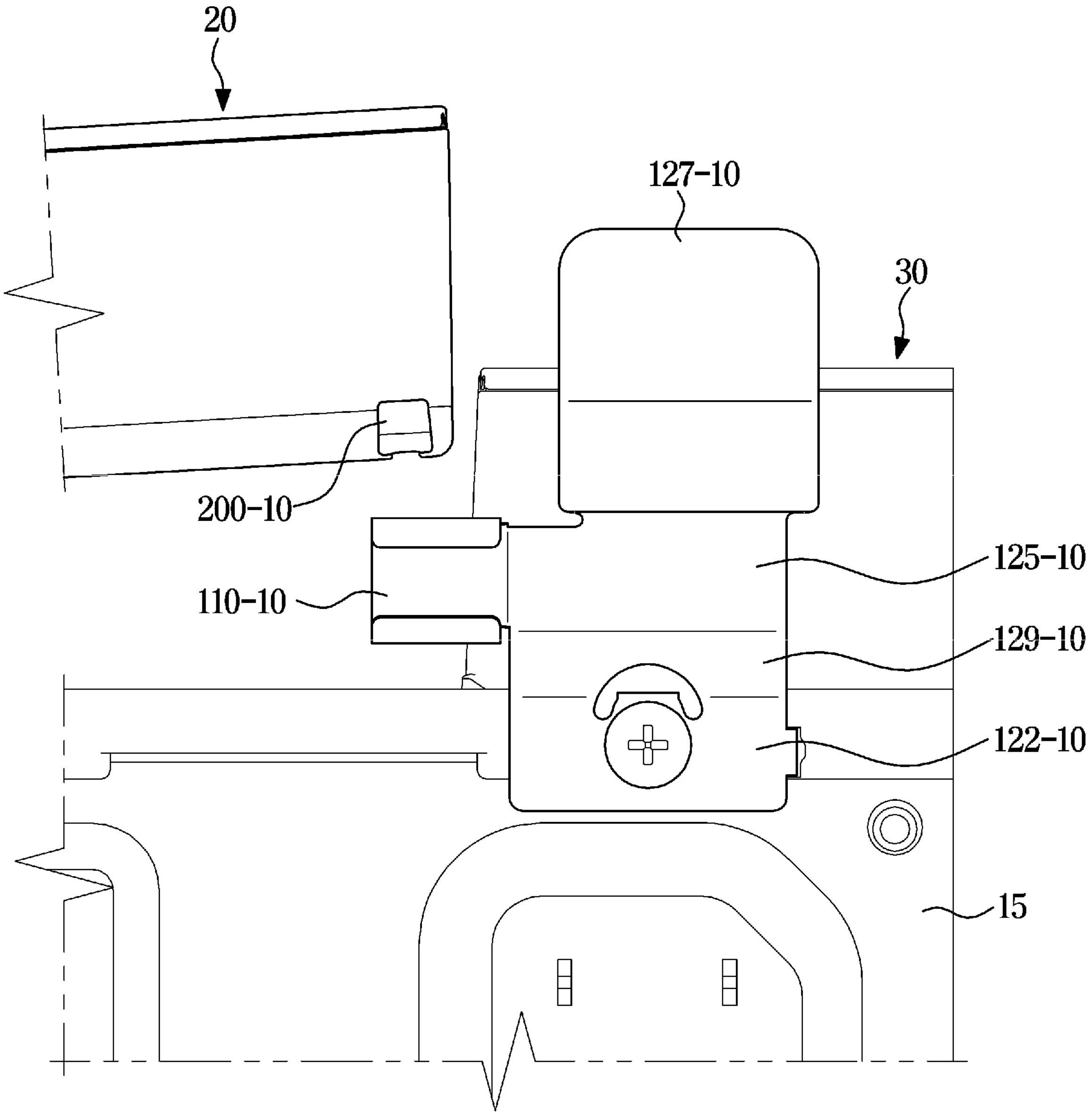
FIG. 32 is a bottom view showing a state in which the door of the cooking apparatus shown in FIG. 31 is located at an open position.

FIG. 32 is a bottom view showing a state in which the door 20 of the cooking apparatus 1 shown in FIG. 31 is located at the open position.

An interaction between the door 20 located at the open position and the door lock 100-10 will be described with reference to FIG. 32.

The catching protrusion 200-10 formed in the door 20 may move in the front direction of the interfering portion 110-10 by climbing over the interfering portion 110-10.

In this case, the door 20 may move to the open position. Accordingly, a user may take a cooking material accommodated in the cooking room 41 out of the cooking apparatus 1.

After the door 20 is located at the open position, the interfering portion 110-10 of the door lock 100-10 may return to the first position from the second position. The reason may be because the catching protrusion 200-10 of the door 20 does not interfere with the interfering portion 110-10 while the door 20 is located at the open position.

Figure 33:
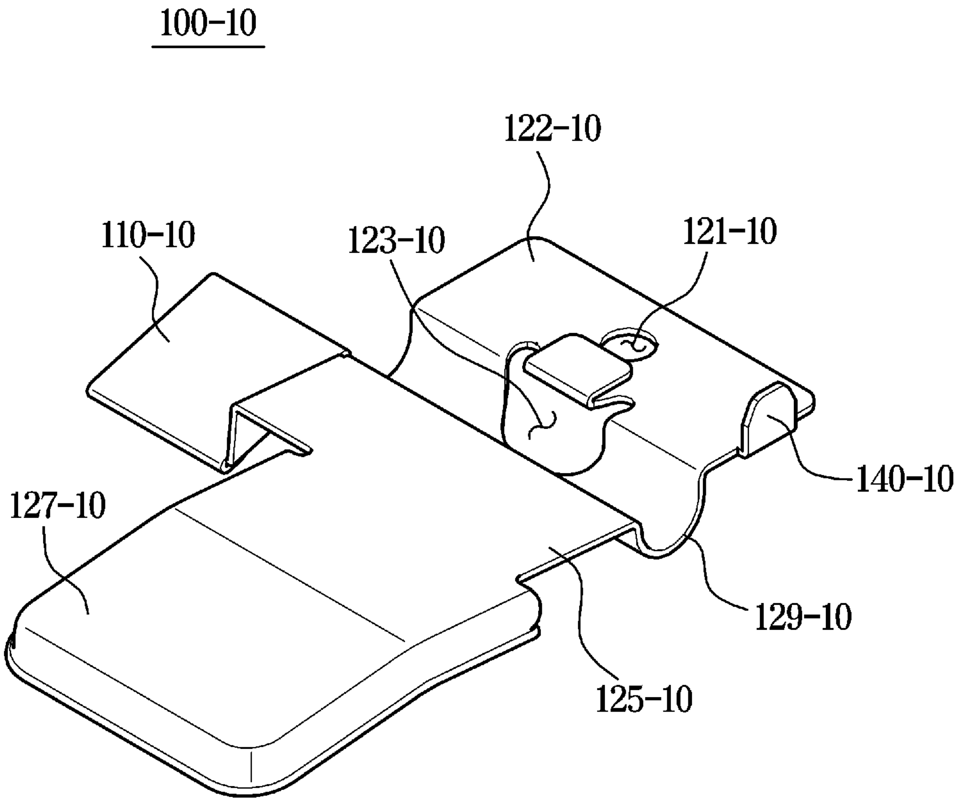
FIG. 33 is a perspective view of the door lock of the cooking apparatus shown FIG. 28.

FIG. 33 is a perspective view of the door lock 100-10 of the cooking apparatus 1 shown FIG. 28.

An exemplary shape of the door lock 100-10 will be described in detail with reference to FIG. 33.

As described above, the door lock 100-10 may include the interfering portion 110-10 capable of contacting the catching protrusion 200-10 included in the door 20 and interfering with the door 20.

A front or rear part of the interfering portion 110-10 may be bent in the rear or front direction. More specifically, the front part of the interfering portion 110-10 may include a shape bent and extending in the rear direction. The rear part of the interfering portion 110-10 may include a shape bent and extending in the front direction. Accordingly, the catching protrusion 200-10 that may contact the front or rear part of the interfering portion 110-10 may be prevented from being damaged.

The interfering portion 110-10 may include a shape inclined in the front direction. The reason may be to prevent the interfering portion 110-10 from interfering with the catching protrusion 200-10 of the door 20 upon a movement of the door 20 from the open position to the closed position. While the door 20 moves from the open position to the closed position, the catching protrusion 200-10 of the door 20 may move in the rear direction along the inclined surface of the interfering portion 110-10, and the interfering portion 110-10 may move in a direction that is away from the door 20.

The door lock 100-10 may include the deformable portion 120-10 for elastically supporting the interfering portion 110-10. The deformable portion 120-10 may be coupled to the bottom panel 15 of the outer case 11. The interfering portion 110-10 may be coupled to a side part of the deformable portion 120-10.

The deformable portion 120-10 may include the coupling portion 122-10 coupled to the bottom panel 15.

The deformable portion 120-10 may include the control portion 127-10 extending in the front direction to be gripped by a user and provided in the front part of the deformable portion 120-10. A front or side part of the control portion 127-10 may be bent downward. Accordingly, a user may be prevented from injury by an edge of the control portion 127-10 while gripping the control portion 127-10.

The deformable portion 120-10 may include an elastic portion 129-10 extending from the coupling portion 122-10 in the front direction and including a downwardly convex shape. The elastic portion 129-10 may cause the deformable portion 120-10 to have a longer length upon deformation of the deformable portion 120-10 to store greater elastic energy.

The deformable portion 120-10 may include a connecting portion 125-10 connected with the control portion 127-10 in front of the elastic portion 129-10.

The interfering portion 110-10 may extend from the connecting portion 125-10 toward the catching protrusion 200-10.

In the deformable portion 120-10, a slit 123-10 may be formed in front of a coupling hole 121-10 which the coupling member 900 may penetrate. A role of the slit 123-10 has been described in the above-described embodiment of the disclosure. By providing the slit 123-10, a distance between a point at which a force is applied and a fixed point may increase to locate the interfering portion 110-10 at the second position with a small force.

The slit 123-10 may be formed in the coupling portion 122-10. The slit 123-10 may be formed in the elastic portion 129-10. The slit 123-10 may be formed from the coupling portion 122-10 to the elastic portion 129-10.

The current embodiment of the disclosure relates to an example in which the slit 123-10 is formed in front of the coupling hole 121-10. However, the slit 123-10 may be formed behind the coupling hole 121-10, as in the above-described embodiment of the disclosure.

The deformable portion 120-10 may include a shape formed by bending a part of the elastic portion 129-10 in the rear direction inside the slit 123-10.

Figure 34:
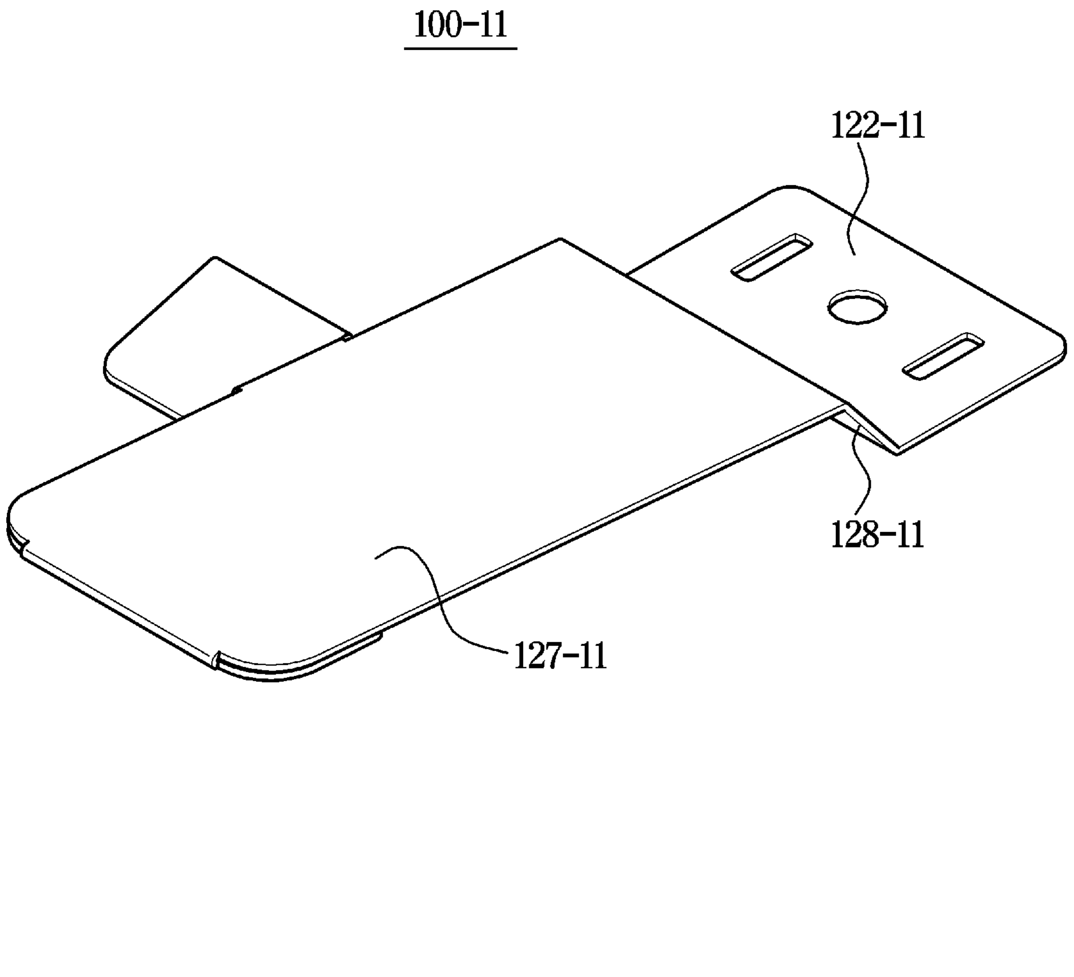
FIG. 34 is a perspective view showing a door lock of a cooking apparatus according to an embodiment of the disclosure.

FIG. 34 is a perspective view showing a door lock 100-11 of the cooking apparatus 1 according to an embodiment of the disclosure.

The door lock 100-11 according to an embodiment of the disclosure will be described with reference to FIG. 34.

The door lock 100-11 may include a control portion 127-11 extending after a first bend upwards from a coupling portion 122-11 and then extending from a second bend toward the front direction.

The control portion 127-11 may include an inclined control portion 128-11 bent upward from the coupling portion 122-11.

The inclined control portion 128-11 may be formed at a location corresponding to a front end of the door 20.

A front end of the control portion 127-11 may include a shape bent in the rear direction.

Unlike the embodiment of the door lock 100 shown in FIG. 33, a component such as the elastic portion 129-10 may be not provided. Accordingly, a manufacturing process may be simplified.

Figure 35:
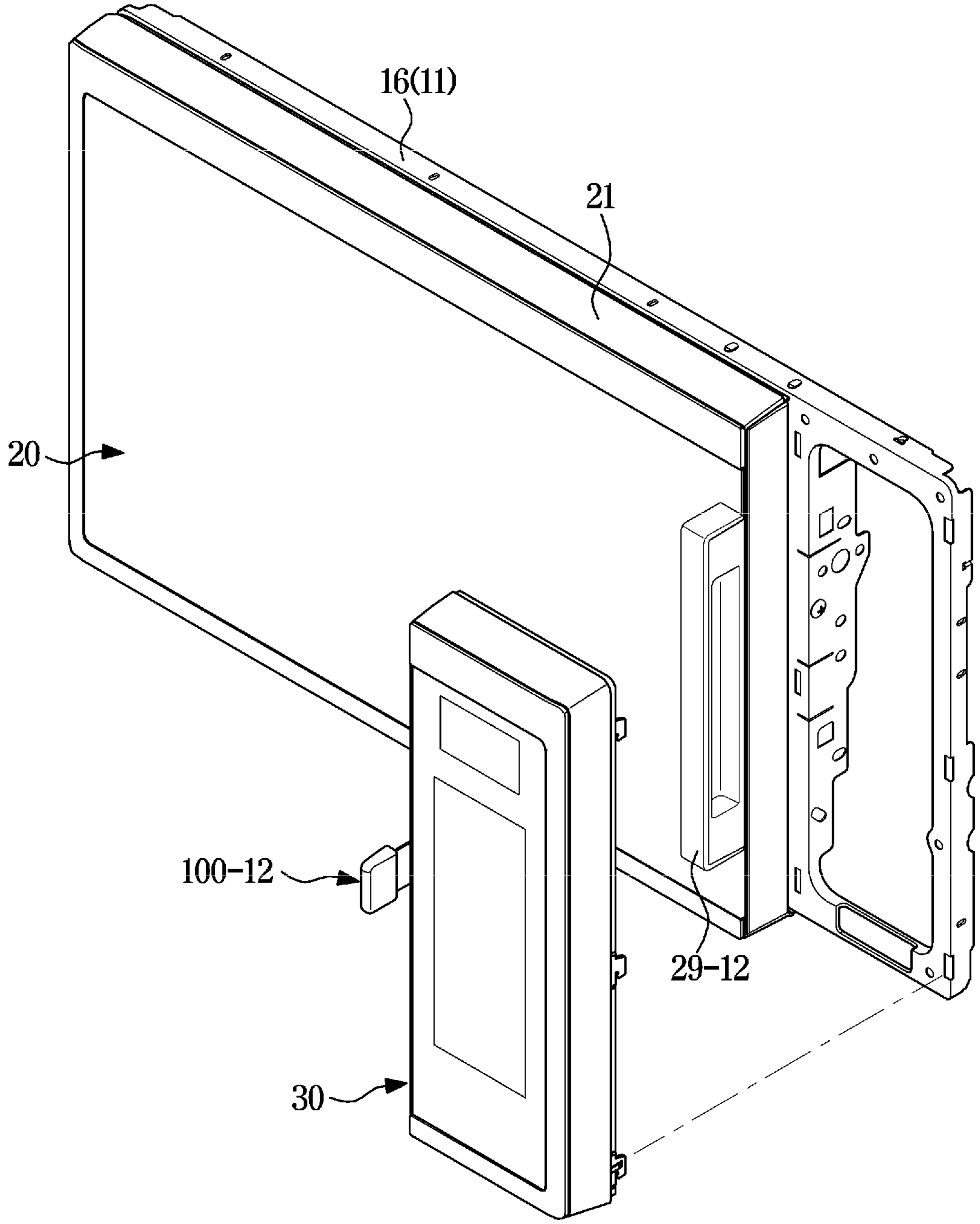
FIG. 35 is an exploded view showing a door lock of a cooking apparatus according to an embodiment of the disclosure.

FIG. 35 is an exploded view showing a door lock 100-12 of the cooking apparatus 1 according to an embodiment of the disclosure.

The door lock 100-12 according to an embodiment of the disclosure will be described with reference to FIG. 35.

The door 20 may include a door handle 29-12. The cooking apparatus 1 including the door handle 29-12 may be configured to open the door 20 by a user's operation of pulling the door handle 29-12 in a direction of opening the door 20, without another operation.

In the current embodiment of the disclosure, the door 20 may include a door body 21, and the door handle 29-12 protruding from the door body 21, and the door lock 100-12 may be coupled to the control panel 30.

According to a concept of the disclosure, the cooking apparatus may include the door lock for moving the door to the open position by two or more operations, resulting in an improvement of safety of use.

According to a concept of the disclosure, the cooking apparatus may cause the interfering portion of the door lock to interfere with a movement of the door at the first position and allow a movement of the door at the second position, thereby causing a user to further perform an operation of moving the location of the interfering portion, instead of performing a single operation, such that the door does not open by a single operation.

Effects that may be achieved by the disclosure are not limited to the above-mentioned effects, and other effects not mentioned will be clearly understood by one of ordinary skill in the technical field to which the disclosure belongs from the following descriptions.

So far, specific embodiments have been shown and described. However, the disclosure is not limited to the above-described embodiments, and various modifications can be made by those skilled in the art without departing from the gist of the technical idea of the disclosure defined by the claims below.

Although the present disclosure has been described with various embodiments, various changes and modifications may be suggested to one skilled in the art. It is intended that the present disclosure encompass such changes and modifications as fall within the scope of the appended claims.

What is claimed is:

1. A cooking apparatus comprising:

a main body defining a cooking room;

a door configured to open and close the cooking room;

a door latch movably installed in the door;

a sensor configured to contact the door latch;

a controller electrically connected with the sensor;

a heating source electrically connected with the controller; and a door lock including an interfering portion configured to interfere with a front surface of the door when opening the door and a deformable portion configured to elastically support the interfering portion such that the interfering portion is movable, wherein the door comprises a catching protrusion protruding to interfere with the door lock, and wherein in response to the contact of the door latch with the sensor ending by opening the door, the controller is configured to control the heating source to stop operating.

2. The cooking apparatus of claim 1, wherein:

the interfering portion is movable to a first position of interfering with opening of the door and a second position of allowing opening of the door, and the deformable portion is configured to elastically support the interfering portion toward the first position.

3. The cooking apparatus of claim 2, wherein:

the interfering portion, at the first position, is configured to allow the door to move between a closed position of closing the cooking room and an interference position of limiting opening of the door, and the interfering portion, at the second position, is configured to allow the door to move between the closed position and an open position of opening the cooking room.

4. The cooking apparatus of claim 3, wherein the door lock comprises an operation surface formed in the interfering portion such that the interfering portion is movable by the door moving from the open position to the closed position.

5. The cooking apparatus of claim 3, wherein the interfering portion is configured to limit opening of the door by a friction force with the door while the door is located at the interference position.

6. The cooking apparatus of claim 3, wherein the interfering portion comprises a support surface configured to support the door in a direction in which the door closes the cooking room while the door is located at the interference position.

7. The cooking apparatus of claim 3, wherein:

the sensor is positioned inside the main body, and the door latch is in contact with the sensor while the door is located at the closed position.

8. The cooking apparatus of claim 2, wherein the second position of the interfering portion is spaced further from the door than the first position of the interfering portion.

9. The cooking apparatus of claim 1, wherein:

the main body comprises a control panel positioned to a side of the door and including an inputter or a display, and the deformable portion is installed on the control panel.

10. The cooking apparatus of claim 1, wherein:

the main body comprises an outer case to which the door is rotatably coupled, and the deformable portion is installed on the outer case.

11. The cooking apparatus of claim 1, wherein:

the catching protrusion protrudes from a bottom of the door, and the interfering portion protrudes from the deformable portion to interfere with the catching protrusion.

12. The cooking apparatus of claim 1, wherein the deformable portion comprises a control portion protruding from the main body and configured to move the interfering portion.

13. The cooking apparatus of claim 1, wherein:

the deformable portion comprises:

a connecting portion connected with the interfering portion; and a coupling portion extending from the connecting portion in a direction away from the interfering portion, and including a coupling hole in which a coupling member penetrates.

14. The cooking apparatus of claim 13, wherein the deformable portion further comprises an extension portion extending from the connecting portion in the direction away from the interfering portion, the extension portion configured to move with respect to the coupling portion.

15. A cooking apparatus comprising:

an outer case;

an inner case positioned inside the outer case, and defining a cooking room;

a door configured to open and close the cooking room, wherein the door is in a closed position when the cooking room is closed;

a control panel comprising a locking surface adjacent to the door and facing the door;

an opening and closing device configured to lock and unlock the door closing the cooking room;

a door latch provided in the door and configured to be movable by the opening and closing device;

a magnetron positioned between the outer case and the inner case and configured to generate a high frequency; and a door lock configured to interfere with a front surface of the door when opening the door, and coupled with the control panel, wherein the door lock includes:

an interfering portion configured to be movable to a first position of interfering with opening of the door and a second position of allowing opening of the door; and a deformable portion coupled to the locking surface and configured to elastically support the interfering portion such that the interfering portion is movable to the first position and the second position, wherein the door comprises a catching protrusion protruding to interfere with the door lock, wherein the door is movable between the closed position and an interference position of limiting opening of the door by the interfering portion while the interfering portion is located at the first position, and movable between the closed position and an open position while the interfering portion is located at the second position, and a heating source is configured to stop operating according to a movement of the door from the closed position to the open position while the interfering portion is located at the second position.

16. The cooking apparatus of claim 15, further comprising:

a sensor provided to be in contact with the door latch;

a controller electrically connected with the sensor; and a high voltage capacitor and a high voltage transformer configured to apply a high voltage to the sensor, wherein the controller is configured to control the high voltage capacitor or the high voltage transformer based on a signal transferred from the sensor.

17. The cooking apparatus of claim 16, wherein the door lock comprises an operation surface formed in the interfering portion such that the interfering portion is moved by the door while the door is moving from the open position to the closed position.

18. The cooking apparatus of claim 15, wherein the second position of the interfering portion is spaced further from the door than the first position of the interfering portion.

19. A cooking apparatus comprising:

a main body forming a cooking room;

a door configured to open and close the cooking room, wherein the door is in a closed position when the cooking room is closed; and a door lock configured to interfere with a front surface of the door when opening the door, wherein the door lock comprises:

an interfering portion configured to be movable to a first position of interfering with opening of the door and a second position of allowing opening of the door; and a deformable portion coupled with the door and configured to elastically support the interfering portion such that the interfering portion is movable to the first position and the second position, wherein the door comprises a catching protrusion protruding to interfere with the door lock, and wherein the door is movable between the closed position and an interference position of limiting opening of the door by the interfering portion while the interfering portion is located at the first position, and movable between the closed position and an open position while the interfering portion is located at the second position.

* * * * *